(12) United States Patent
Trifkovic et al.

(10) Patent No.: US 11,458,444 B2
(45) Date of Patent: Oct. 4, 2022

(54) METHODS OF FORMING A BICONTINUOUS INTRAPHASE JAMMED EMULSION GEL AND USES THEREOF

(71) Applicant: InnVTEK Inc., Calgary (CA)

(72) Inventors: Milana Trifkovic, Calgary (CA); Brandy Pilapil, Calgary (CA); Aseem Pandey, Calgary (CA); Rachel Alexis Malone, Calgary (CA)

(73) Assignee: InnVTEK Inc., Calgary (CA)

( * ) Notice: Subject to any disclaimer, the term of this patent is extended or adjusted under 35 U.S.C. 154(b) by 239 days.

(21) Appl. No.: 16/710,808

(22) Filed: Dec. 11, 2019

(65) Prior Publication Data

US 2020/0353436 A1    Nov. 12, 2020

Related U.S. Application Data

(60) Provisional application No. 62/781,239, filed on Dec. 18, 2018.

(51) Int. Cl.
| | |
|---|---|
| *B01J 13/00* | (2006.01) |
| *B01D 69/02* | (2006.01) |
| *B01D 67/00* | (2006.01) |
| *B01D 71/66* | (2006.01) |
| *B01D 71/82* | (2006.01) |
| *C01B 33/14* | (2006.01) |
| *B01D 71/02* | (2006.01) |
| *B82Y 30/00* | (2011.01) |
| *B82Y 40/00* | (2011.01) |

(52) U.S. Cl.
CPC ...... *B01J 13/0056* (2013.01); *B01D 67/0093* (2013.01); *B01D 69/02* (2013.01); *B01D 71/021* (2013.01); *B01D 71/027* (2013.01); *B01D 71/66* (2013.01); *B01D 71/82* (2013.01); *B01J 13/0065* (2013.01); *B01J 13/0069* (2013.01); *C01B 33/14* (2013.01); *B01D 2325/02* (2013.01); *B82Y 30/00* (2013.01); *B82Y 40/00* (2013.01)

(58) Field of Classification Search
CPC .............. B01J 13/0056; B01J 13/0065; B01J 13/0069; B01D 67/0093; B01D 69/02; B01D 71/021; B01D 71/027; B01D 71/66; B01D 71/82; B01D 67/0041; B01D 67/0079; B01D 69/141; B01D 67/0046; B01D 67/0048; B01D 69/148; C01B 33/14

See application file for complete search history.

(56) References Cited

U.S. PATENT DOCUMENTS

| | | | |
|---|---|---|---|
| 9,187,646 B1 * | 11/2015 | Fan | ............. C09C 1/04 |
| 2016/0200891 A1 * | 7/2016 | Virgilio | ............. B01D 71/027 |
| | | | 424/492 |

OTHER PUBLICATIONS

Le Li, Caroline Miesch, P. K. Sudeep, Anna C. Balazs, Todd Emrick, Thomas P. Russell, and Ryan C. Hayward, Kinetically Trapped Co-continuous Polymer Morphologies through Intraphase Gelation of Nanoparticles, Nano Letters 2011 11 (5), 1997-2003 DOI: 10.1021/nl200366z (Year: 2011).*

(Continued)

*Primary Examiner* — Chester T Barry
(74) *Attorney, Agent, or Firm* — Clark & Elbing LLP

(57) ABSTRACT

Provided herein is a method of forming a bicontinuous intraphase jammed emulsion gel.

22 Claims, 14 Drawing Sheets

(56) References Cited

OTHER PUBLICATIONS

Dmitri V. Talapin, Elena V. Shevchenko, Christopher B. Murray, Andreas Kornowski, Stephan Förster, and Horst Weller, CdSe and CdSe/CdS Nanorod Solids, J. Am. Chem. Soc. 2004, 126, 40, 12984-12988, https://doi.org/10.1021/ja046727v (Year: 2004).*
Bai et al.,"Dynamics and Rheology of Nonpolar Bijels," Soft Matter. 11(26):5282-5293 (2015).
Office Action for Canadian Patent Application No. 3,064,670, dated Oct. 19, 2020 (5 pages).
Chabi et al., "Three Dimensional (3d) Flexible Graphene Foam/polypyrrole Composite: Towards Highly Efficient Supercapacitors," Rsc Advances. 5(6):3999-4008 (2015) (12 pages).
Ducker et al., "Forces between Alumina Surfaces in Salt Solutions: Non-DLVO Forces and the Implications for Colloidal Processing," J Am Ceram Soc. 77(2):437-443 (1994).
Fischer et al., "Synthesis of High-Surface-Area TiN/Carbon Composite Materials with Hierarchical Porosity via Reactive Templating," Chem Mater. 20(24):7383-7389 (2008).
Gallagher et al., "Partitioning of Polystyrene Latex Spheres in Immiscible Critical Liquid Mixtures," Phys Rev A. 46(4):2012-2021 (2012).
Gallagher et al., "Aggregation in Polystyrene-sphere Suspensions in Near-critical Binary Liquid Mixtures," Phys Rev A. 46(12):7750-7755 (2012).
Gao et al., "Microdynamics and Arrest of Coarsening During Spinodal Decomposition in Thermoreversible Colloidal Gels," Soft Matter. 11(32):6360-6370 (2015).
Grattoni et al., "Lower Critical Solution Coexistence Curve and Physical Properties (Density, Viscosity, Surface Tension, and Interfacial Tension) of 2,6 Lutidine Water," J Chem Eng Data. 38(4):516-519 (1993).
Herzig et al., "Bicontinuous Emulsions Stabilized Solely by Colloidal Particles," Nature Materials. 6(12):966-971 (2007).
Huang et al., "Bicontinuous Structured Liquids With Sub-micrometre Domains Using Nanoparticle Surfactants," Nat Nanotechnol. 12(11):1060-1063 (2017) (5 pages).
Huang et al., "Controlling the Morphology of Immiscible Cocontinuous Polymer Blends via Silica Nanoparticles Jammed at the Interface," Macromolecules. 49(10):3911-3918 (2016).
Imperial et al., "A Simple Route Towards Graphene Oxide Frameworks," Materials Horizons. 1:139-145 (2014).
Karaman et al., "A comparison of the interaction forces between model alumina surfaces and their colloidal properties," Colloids and Surfaces. 129-130:239-255 (1997).
Konishi et al., "Phase-Separation-Induced Titania Monoliths with Well-Defined Macropores and Mesostructured Framework from Colloid-Derived Sol-Gel Systems," Chem Mater. 18(4):864-866 (2006).
Lee et al., "Bicontinuous Macroporous Materials from Bijel Templates," Adv Mater. 22(43):4836-4841 (2010).
Lee et al., "Hierarchically Porous Silver Monoliths from Colloidal Bicontinuous Interfacially Jammed Emulsion Gels," J Am Chem Soc. 133(18):6945-6947 (2011).
Lee et al., "Making a Robust Interfacial Scaffold: Bijel Rheology and its Link to Processability," Adv Funct Mater. 23(4):417-423 (2013).
Li et al., "Role of Bound Water on the Viscosity of Nanometric Alumina Suspensions," J Am Ceram Soc. 88(6):1448-1454 (2005).
Li et al., "Kinetically Trapped Co-continuous Polymer Morphologies Through Intraphase Gelation of Nanoparticles," Nano Lett. 11(5):1997-2003 (2011).
Lu et al., "Gelation of Particles With Short-range Attraction," Nature. 453(7194):499-503 (2008) (6 pages).
Lu et al., Chapter 4 Particle-Particle Interactions, *Studies in Interface Science*, Elsevier, 172-244 (2005).
Nakanishi, "Pore Structure Control of Silica Gels Based on Phase Separation," Journal of Porous Materials. 4:67-112 (1997).
Oh et al., "Ordered Macroporous Platinum Electrode and Enhanced Mass Transfer in Fuel Cells Using Inverse Opal Structure," Nat Commun. 4:2473 (2013).
Oles, "Shear-induced Aggregation and Breakup of Polystyrene Latex Particles," Journal of Colloid and Interface Science. 154(2):351-358 (1992).
Pilapil et al., "Ordered Porous Electrodes by Design Toward Enhancing the Effective Utilization of Platinum in Electrocatalysis," Adv Funct Matter. 27(36):1703171 (2017).
Polat et al., "Effect of Ph and Hydration on the Normal and Lateral Interaction Forces Between Alumina Surfaces," J Colloid Interface Sci. 304(2):378-387 (2006).
Reeves et al., "Quantitative Morphological Characterization of Bicontinuous Pickering Emulsions via Interfacial Curvatures," Soft Matter. 12(18):4082-4092 (2016).
Tavacoli et al., "Novel, Robust, and Versatile Bijels of Nitromethane, Ethanediol, and Colloidal Silica: Capsules, Sub-Ten-Micrometer Domains, and Mechanical Properties," Adv Funt Mater. 21:2020-2027 (2011).
Thorson et al., "Composite Bijel-Templated Hydrogels for Cell Delivery," ACS Biomater Sci Eng. 4(2):587-594 (2008).
Trogadas et al., "Hierarchically Structured Nanomaterials for Electrochemical Energy Conversion," Angew Chem. 55(1):122-48 (2000).
Welch et al., "Jammed Limit of Bijel Structure Formation," Langmuir. 33(45):13133-13138 (2017).
White et al., "Influence of Particle Composition and Thermal Cycling on Bijel Formation," J Phys: Condens Matter. 20:494223 (2008) (6 pages).
White et al., "Inversion of Particle-stabilized Emulsions of Partially Miscible Liquids by Mild Drying of Modified Silica Particles," Journal of Colloid and Interface Science. 359(1):126-135 (2011).
Witt et al., "Bijel Reinforcement by Droplet Bridging: A Route to Bicontinuous Materials With Large Domains," Soft Matter. 9(23):6773-6780 (2013).
Witt et al., "Microstructural Tunability of Co-continuous Bijel-derived Electrodes to Provide High Energy and Power Densities," Journal of Materials Chemistry. 4(3):1000-1007 (2016) (9 pages).
Wu et al., "A Model Relating Structure of Colloidal Gels to Their Elastic Properties," Langmuir. 17(4):1030-1036 (2001).
Yue et al., "Lithium-Ion Batteries: 3D Current Collectors for Lithium-Ion Batteries: A Topical Review," Small Methods. 2(8):1800056 (2018) (20 pages).
Zhanga et al., "Synthesis and Applications of Emulsion-templated Porous Materials," Soft Matter. 1(2):107-113 (2005).

* cited by examiner

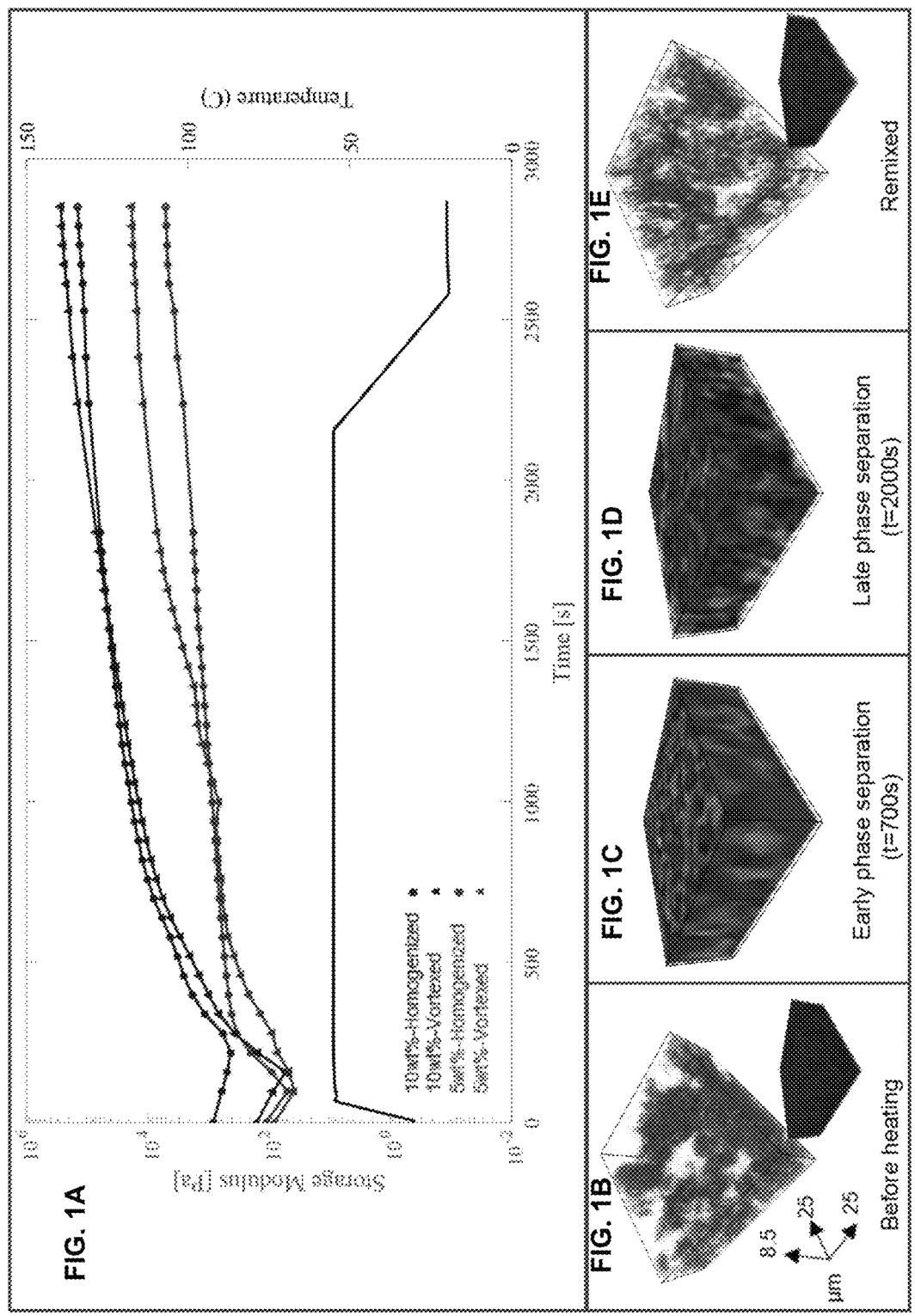

FIG. 7A
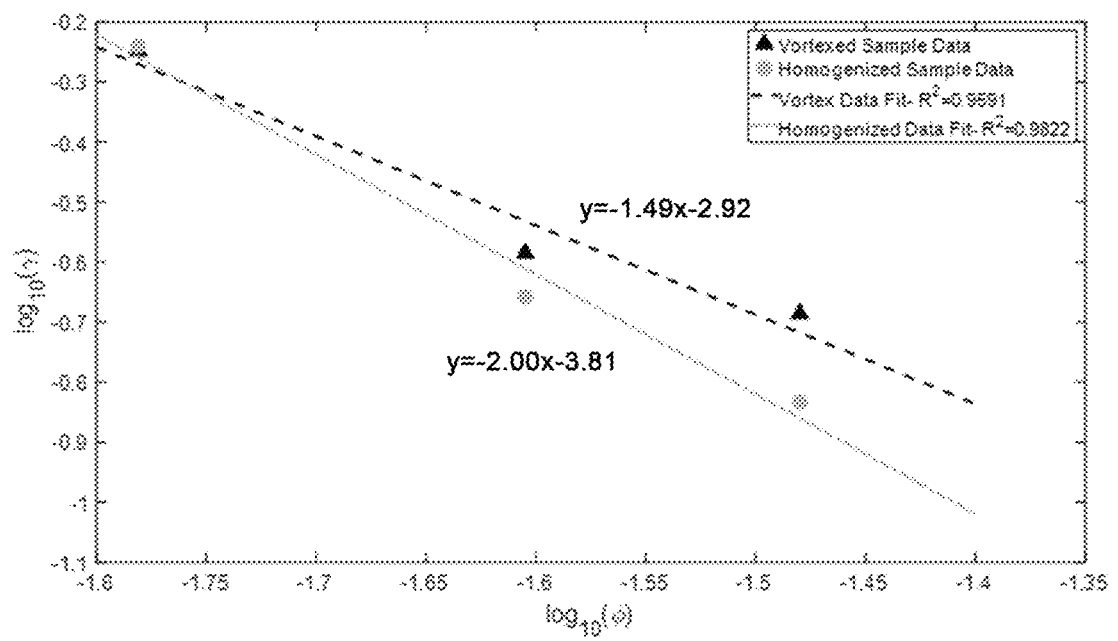
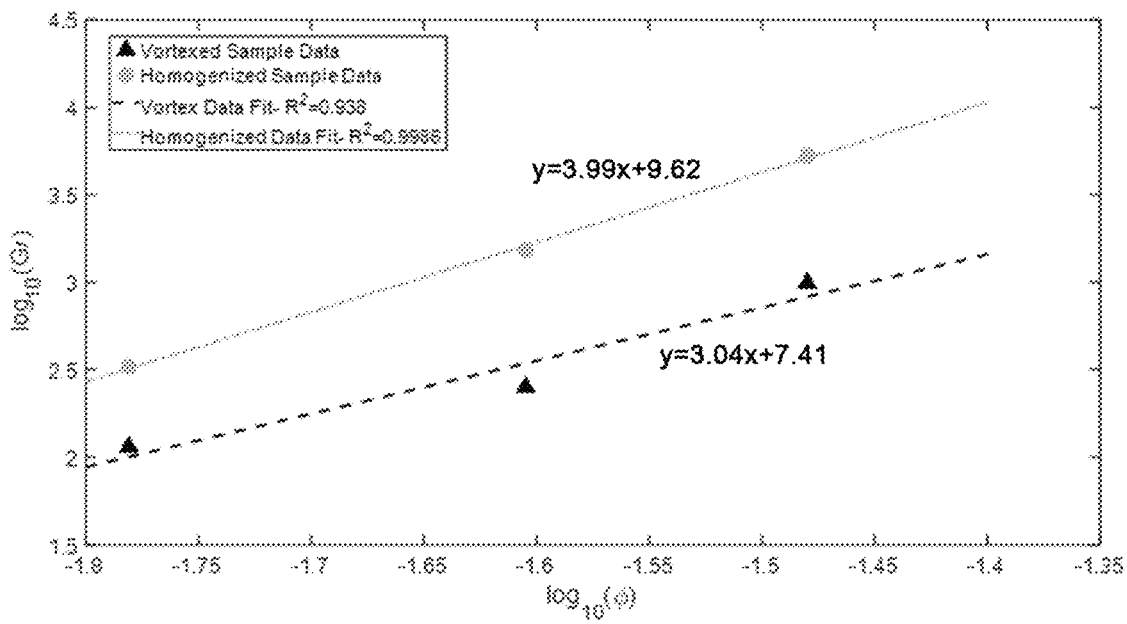
FIG. 7B

FIG. 12A
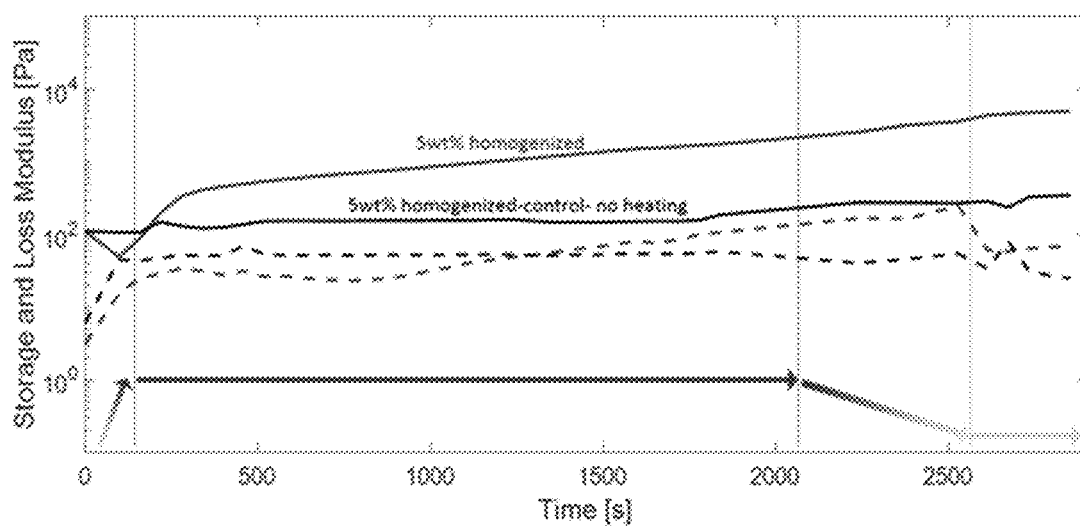
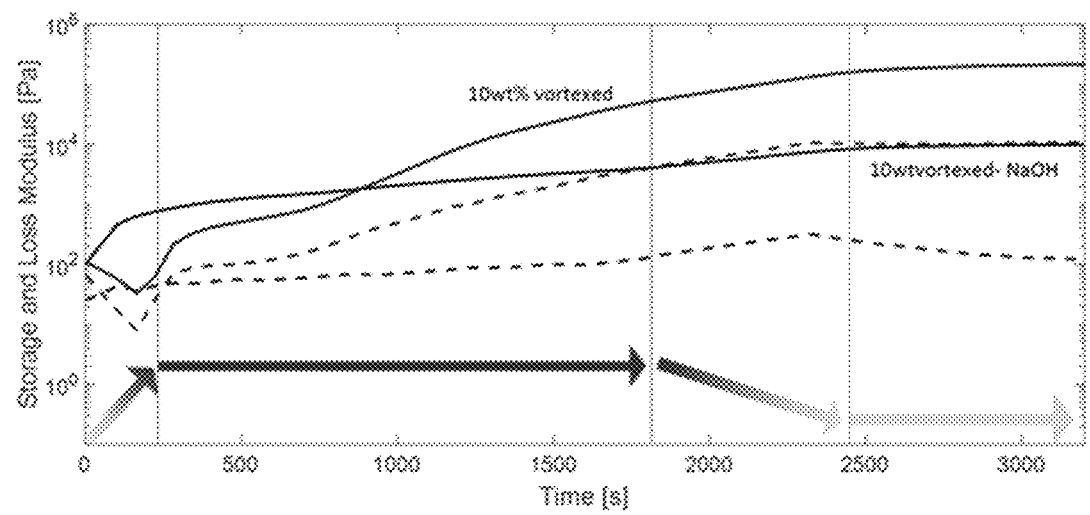
FIG. 12B

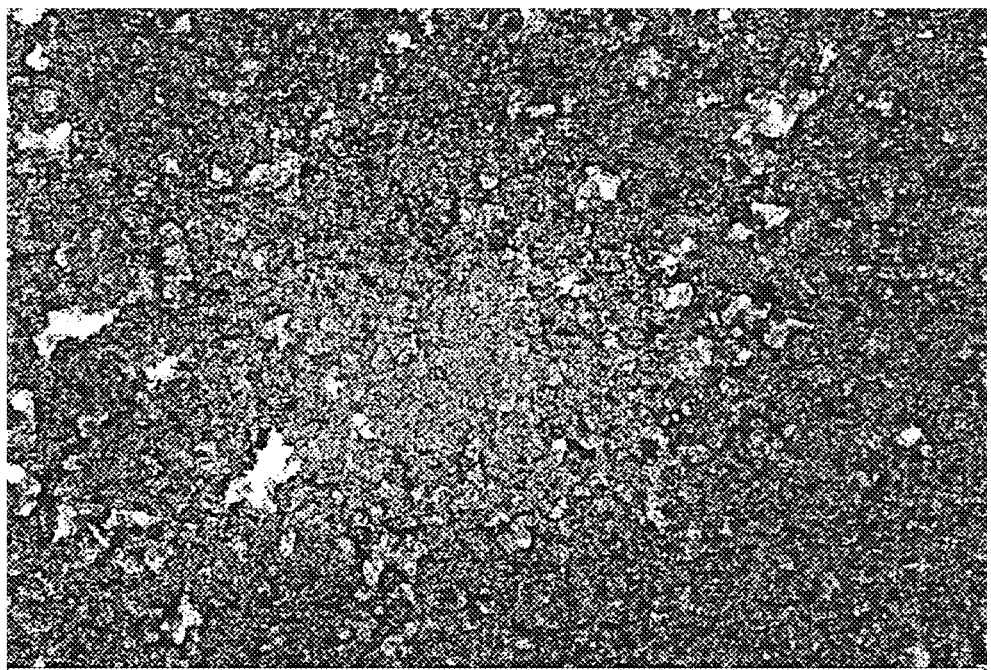
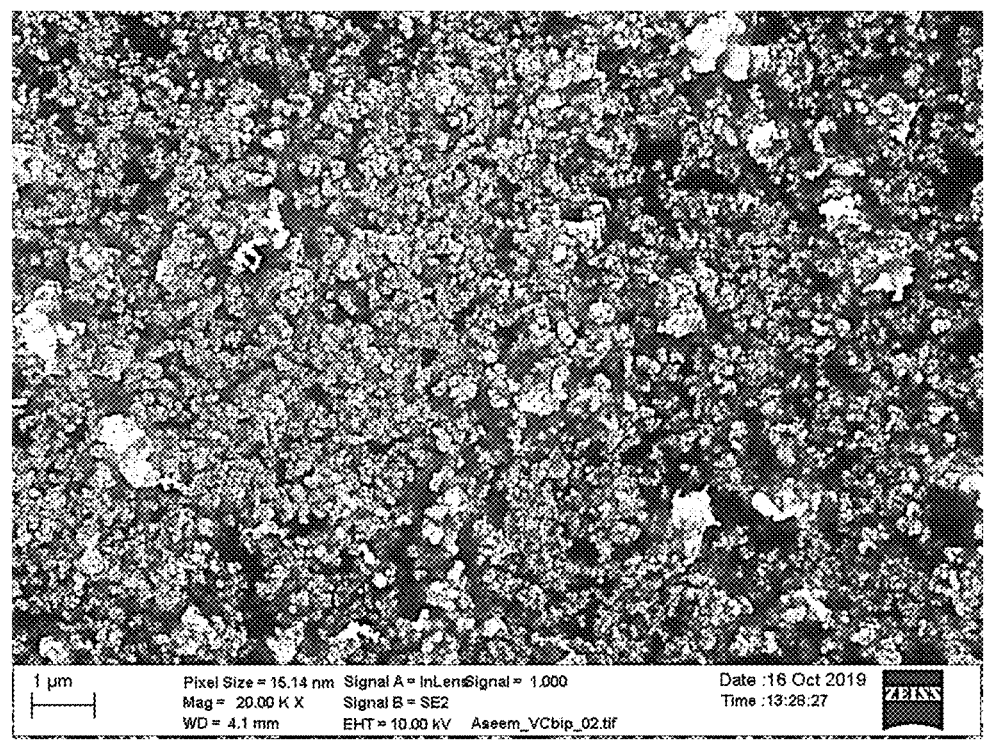
FIG. 18

METHODS OF FORMING A BICONTINUOUS INTRAPHASE JAMMED EMULSION GEL AND USES THEREOF

CROSS REFERENCE TO RELATED APPLICATION

This application claims priority to United States Provisional Patent Application No. U.S. 62/781,239, filed Dec. 18, 2018, the entire contents of which is hereby incorporated by reference.

FIELD

The present disclosure relates generally to bicontinuous materials. More particularly, the present disclosure relates to methods of forming a bicontinuous intraphase jammed emulsion gel and uses thereof.

BACKGROUND

For effective use of porous materials which required optimized interfacial interactions, bicontinuous materials with a hierarchical porosity are generally considered ideal as to provide a percolating pathway for, reactants, and products, and a large interfacial surface area for reaction/storage. Finally, the preparation of these materials via a low-temperature, solvent-driven template method is advantageous, as these methods tend to be less tedious, have reduced material cost and are more suitable for scale-up in industrial application.[1-3] Bicontinuous porous materials may be prepared through a variety of routes, such as polymer blends,[4] or templating, (e.g. foams, emulsions or colloidal templates).[5,6] Inverse opaline structures (also known as 3D ordered macroporous, 3DOM, structures) have been highlighted in recent EES and electrocatalysis literature due to their near ideality in the above design aspects.[1-3,7,8] 3DOM structures are fully bicontinuous and may be hierarchical in nature, using a solid template to create the macropores and either nanoparticles or porous infiltration of the solid template to generate nanoscale features.[7,9] A main drawback of the 3DOM structures is their reliance on templating, and the existence of constrictions between pores, which can inhibit effective mass transport and increase diffusion lengths.

In order to improve on 3DOM structures, bicontinuous materials prepared via spinodal decomposition routes are desirable. These methods produce porous scaffolds with consistent channel width, enabling superior mass transport properties owing to reduced diffusion lengths,[10] and require no template for formation. Polymerization-induced phase separation was first used to prepare monoliths with silica in 1997,[11] and later used in 2006 to prepare titania monoliths.[12] Although desirable structures were produced, the necessity of polymeric inclusions and need for coordinating the sol-gel transition and polymerization is undesirable for many applications. Moreover, the produced structures lack hierarchy of the microstructure. Further studies have exploited gelation of spherical species in suspension with short-range attractions by spinodal decomposition to generate bicontinuous flocculants,[13,14] but no reports of isolation of a free-standing monolith from this route are seemingly available. A more recent-class of soft materials which utilizes spinodal decomposition to generate bicontinuous materials is bicontinuous interfacially jammed emulsion gels (bijels), whereby fluid spinodal decomposition is arrested by nanoparticle interfacial jamming to preserve a bicontinuous fluid structure.[15,16] The preparation of porous materials with uniform, co-continuous channels and hierarchial porosity using bijels has been demonstrated in a number of recent publications by Mohraz et al.[17-19] This isolation is achieved via stabilization of the bicontinuous back bone via polymerization of one phase of the spinodaly decomposed fluid mixture. This methodology provides advantages over other methods, but stringent requirements for particle wettability, to ensure sufficient jamming between two liquids with low interfacial tension, and a requirement of introducing a polymeric backbone does not lend itself to industrial production/use.[18,20-22]

Critical polymer solutions undergoing spinodal decomposition can also produce co-continuous morphologies, though typically with larger domain sizes and at higher processing temperatures than for fluid or gelation spinodal decomposition.[4] Stabilization of these co-continuous morphologies, as a potential route to functional hierarchial materials, has been achieved similarly to bijels through interfacial jamming by nanoparticles.[4,23] More recently, Li et al. have shown that the formation of a percolating network of attractive nanoparticles localized in a single phase of a polymer blend can arrest spinodal decomposition and stabilize bicontinuous morphologies.[24] This route, whereby attractive nanoparticles form a percolating, hierarchial, bicontinuous network within a single phase seems ideal for one-step generation of hierarchial, bicontinuous porous materials; the use of polymers is not ideal though, as their removal to reveal the underlying particle-based structure would be energy intensive.

SUMMARY

In an aspect of the present disclosure, there is provided a method of forming a bicontinuous intraphase jammed emulsion gel, the method comprising providing a suspension of nanoparticles in a one-phase liquid mixture; and triggering spinodal decomposition of the one-phase liquid mixture to form a two-phase liquid mixture, the nanoparticles aggregating into one phase of the two-phase liquid mixture to form a bicontinuous intraphase jammed emulsion gel (BIPJEL).

In an embodiment of the present disclosure, there is provided a method further comprising isolating the BIPJEL as a porous monolith.

In another embodiment, there is provided a method wherein providing a suspension comprises forming the one-phase liquid mixture from a pre-determined ratio of a first liquid and a second liquid.

In another embodiment, there is provided a method wherein forming the one-phase liquid mixture from a pre-determined ratio of a first liquid and a second liquid comprises selecting the first liquid and the second liquid to undergo spinodal decomposition.

In another embodiment, there is provided a method wherein the first liquid is selected to be water (W) and the second liquid is selected to be 2,6-lutidine (L).

In another embodiment, there is provided a method wherein the pre-determined ratio is approximately 70:30 W/L; or approximately 72:28 W/L.

In another embodiment, there is provided a method wherein providing a suspension comprises selecting nanoparticles that form a colloidal gel in the one-phase liquid mixture.

In another embodiment, there is provided a method wherein selecting nanoparticles that form a colloidal gel in the one-phase liquid mixture comprises selecting the one-phase liquid mixture that has a pre-determined pH and selecting the nanoparticles that have a low surface charge at that pre-determined pH.

In another embodiment, there is provided a method wherein the pre-determined pH is approximately 9.

In another embodiment, there is provided a method wherein the nanoparticles are selected to be alumina-coated silica (AlO—SiO) nanoparticles.

In another embodiment, there is provided a method wherein the nanoparticles are at a concentration of approximately 5 wt % to approximately 10 wt %; or approximately 5 wt % to approximately 15 wt %; or approximately 5 wt % to approximately 20 wt %.

In another embodiment, there is provided a method wherein the nanoparticles are at a concentration of approximately 5 wt %; or approximately 10 wt %.

In another embodiment, there is provided a method wherein providing a suspension comprises mixing the nanoparticles and the one-phase liquid mixture.

In another embodiment, there is provided a method wherein the mixing comprises low-energy mixing or high-energy mixing.

In another embodiment, there is provided a method wherein low-energy mixing comprises vortexing the nanoparticles and the one-phase liquid mixture.

In another embodiment, there is provided a method wherein high-energy mixing comprises homogenizing the nanoparticles and the one-phase liquid mixture.

In another embodiment, there is provided a method wherein triggering spinodal decomposition comprises heating the suspension to quench the one-phase liquid mixture into the two-phase liquid mixture.

In another embodiment, there is provided a method wherein heating the suspension comprises heating the suspension to, or above the lower critical solution temperature of the one-phase liquid mixture.

In another embodiment, there is provided a method wherein the lower critical solution temperature is approximately 34° C.

In another embodiment, there is provided a method wherein isolating the BIPJEL as a porous monolith comprises freezing the BIPJEL.

In another embodiment, there is provided a method wherein freezing the BIPJEL comprises submerging the BIPJEL in liquid nitrogen.

In another embodiment, there is provided a method wherein isolating the BIPJEL as a porous monolith further comprises vacuum drying the BIPJEL.

In another embodiment, there is provided a method wherein the porous monolith has macroporosity and mesoporosity.

In another embodiment, there is provided a method further comprising mixing an additive into the suspension of nanoparticles in the one-phase liquid mixture.

In another embodiment, there is provided a method wherein the additive is a water-soluble polymer.

In another embodiment, there is provided a method wherein the water-soluble polymer is polyethyleneglycol.

In another embodiment, there is provided a method wherein the additive is graphene oxide.

In another embodiment, there is provided a method wherein the additive is Vulcan Carbon used for PEM fuel cell catalyst layer.

In another embodiment, there is provided a method wherein the additive is Silica with Polyethyleneimine as additive for carbon capture applications.

In another aspect of the present disclosure, there is provided a porous monolith formed by the method described herein.

In another aspect of the present disclosure, there is provided a use of the porous monolith described herein in catalysis.

In another aspect of the present disclosure, there is provided a use of the porous monolith described herein as an electrode.

In another aspect of the present disclosure, there is provided a use of the porous monolith described herein in a fuel cell.

In another aspect of the present disclosure, there is provided a use of the porous monolith described herein for electrochemical energy storage.

In another aspect of the present disclosure, there is provided a use of the porous monolith described herein as a biomedical tissue scaffolding.

BRIEF DESCRIPTION OF THE FIGURES

Embodiments of the present disclosure will now be described, by way of example only, with reference to the attached Figures.

FIGS. 1A-1E depict storage modulus evolution of 5 and 10 NP-wt % AlO—SiO NP stabilized W/L bipjels pre-mixed via either vortexing or rotor stator homogenizing probed via small angle oscillatory shear at a frequency of 1 Hz (FIG. 1A). Temperature profile of the sample shown on the right y-axis in black (FIGS. 1B, 1C, 1D, and 1E). Three dimensional volume renderings of laser scanning confocal microscopy (LSCM) images of the 5 NP-wt % vortexed AlO—SiO NP stabilized W/L at various stages in the experiment. Reflection of a 552 nm laser from the AlO—SiO NPs is shown in green, while fluorescence from Nile Red, which preferentially segregates to the lutidine phase, is shown in red. Prior to heating and after re-mixing, W/L form a single phase over which Nile red uniformly (shown as insets) and the reflection channel is shown separately to demonstrate the initial colloidal gel and final, spinodal decomposition templated, nanoparticle network.

FIGS. 7A and 7B depict plots of the logarithm of the LVE strain limit (FIG. 7A) and storage moduli (FIG. 7B) vs the logarithm of the particle volume fraction used to analyze the initial gel strength as a function of mixing method according to the methods of Wu and Morbidelli.[27]

FIGS. 12A and 12B depict evolution of the storage (solid lines) and loss (dashed lines) moduli for colloidal suspensions prepared with particle loadings of (FIG. 12A) 5 NP-wt % homogenized or (FIG. 12B) 10 NP-wt % vortexed in either the critical W/L mixture or diluted in water adjusted to a pH of 10 by addition of 0.5 M NaOH as a control for comparison of the effect of spinodal decomposition on gel strengthening. A qualitative indication of the temperature profile in each region of the test is shown. The only sample to not undergo heating has been labelled as such.

(FIG. 14A) showing both 5 and 10 NP-wt % samples and both mixing methods (homogenized/H or Vortexed/V) and (FIG. 14B) showing the 5 wt-NP % samples compared to a 5 wt-H control sample (black), which was prepared in the critical W/L mixture but not subjected to heating above the critical solution temperature. It is proposed that the primary differences between the slopes of the 5 and 10 NP-wt % samples was due to an increased effect for higher particle concentrations as NP-floc agglomerates optimized and condensed during aging. Differences between vortexed and homogenized samples was attributed to the looser nature of the vortexed flocs leading to significantly more rearrangement during later stages of aging. Slopes were determined using least squares regression reported at the initial time taken for every 10$^{th}$ data point of 100 seconds of data.

FIG. 18 depicts a representative scanning electron microscopy image of a dried 10 NP-wt % Vulcan carbon XC-72 subjected to spinodal decomposition, indicating co-continuity. White scale bars indicate 2 micron and 1 micron respectively.

DETAILED DESCRIPTION

Figure 2A:
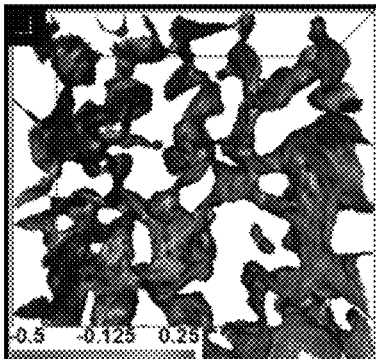
FIGS. 2A-2D depict surface reconstruction showing the mean curvature (FIGS. 2A and 2C) for a 10 NP-wt %, vortex-mixed W/L bipjel sample after coarsening and the corresponding (FIG. 2B) Gauss and (FIG. 2D) mean curvature evolution of the same sample during coarsening. The size of the volume in the rendering in (FIG. 2A) corresponds to 93×93×32 µm, while (FIG. 2C) is a close-up of the same surface showing the surface triangles with a scale bar of 2 µm. In this curvature analysis, the curvature is defined as positive if it curves towards the lutidine-rich phase.

Generally, the present disclosure provides a method of forming a bicontinuous intraphase jammed emulsion gel.

In some examples, the materials and method described herein optimize flow behavior via optimized three-dimensional diffusion to the nano-structured surface of the porous materials as well as through the general porous networks that promote laminar flow (flow channels are of approximately constant width). These porous materials may be generated with or without organic binders, to promote structural stability. Composites, including, but not limited to, polymers and various nano- and micro-structures may also be incorporated to expand uses to areas including but not limited to applications in health sciences, green energy and advanced technologies.

In an example of the present disclosure, there is provided a method of forming a bicontinuous intraphase jammed emulsion gel, the method comprising providing a suspension of nanoparticles in a one-phase liquid mixture; and triggering spinodal decomposition of the one-phase liquid mixture to form a two-phase liquid mixture, the nanoparticles aggregating into one phase of the two-phase liquid mixture to form a bicontinuous intraphase jammed emulsion gel (BIPJEL).

In another example, there is provided a method further comprising isolating the BIPJEL as a porous monolith.

In another example, there is provided a method wherein providing a suspension comprises forming the one-phase liquid mixture from a pre-determined ratio of a first liquid and a second liquid.

In another example, there is provided a method wherein forming the one-phase liquid mixture from a pre-determined ratio of a first liquid and a second liquid comprises selecting the first liquid and the second liquid to undergo spinodal decomposition.

In another example, there is provided a method wherein the first liquid is selected to be water (W) and the second liquid is selected to be 2,6-lutidine (L).

In another example, there is provided a method wherein the pre-determined ratio is approximately 70:30 W/L; or approximately 72:28 W/L.

In another example, there is provided a method wherein providing a suspension comprises selecting nanoparticles that form a colloidal gel in the one-phase liquid mixture.

In another example, there is provided a method wherein selecting nanoparticles that form a colloidal gel in the one-phase liquid mixture comprises selecting the one-phase liquid mixture that has a pre-determined pH and selecting the nanoparticles that have a low surface charge at that pre-determined pH.

In another example, there is provided a method wherein the pre-determined pH is approximately 9.

In another example, there is provided a method wherein the nanoparticles are selected to be alumina-coated silica (AlO—SiO) nanoparticles.

In another example, there is provided a method wherein the nanoparticles are at a concentration of approximately 5 wt % to approximately 10 wt %; or approximately 5 wt % to approximately 15 wt %; or approximately 5 wt % to approximately 20 wt %.

In another example, there is provided a method wherein the nanoparticles are at a concentration of approximately 5 wt %; or approximately 10 wt %.

In another example, there is provided a method wherein providing a suspension comprises mixing the nanoparticles and the one-phase liquid mixture.

In another example, there is provided a method wherein the mixing comprises low-energy mixing or high-energy mixing.

In another example, there is provided a method wherein low-energy mixing comprises vortexing the nanoparticles and the one-phase liquid mixture.

In another example, there is provided a method wherein high-energy mixing comprises homogenizing the nanoparticles and the one-phase liquid mixture.

In another example, there is provided a method wherein triggering spinodal decomposition comprises heating the suspension to quench the one-phase liquid mixture into the two-phase liquid mixture.

In another example, there is provided a method wherein heating the suspension comprises heating the suspension to, or above the lower critical solution temperature of the one-phase liquid mixture.

In another example, there is provided a method wherein the lower critical solution temperature is approximately 34° C.

In another example, there is provided a method wherein isolating the BIPJEL as a porous monolith comprises freezing the BIPJEL.

In another example, there is provided a method wherein freezing the BIPJEL comprises submerging the BIPJEL in liquid nitrogen.

In another example, there is provided a method wherein isolating the BIPJEL as a porous monolith further comprises vacuum drying the BIPJEL.

In another example, there is provided a method wherein the porous monolith has macroporosity and mesoporosity.

In another example, there is provided a method further comprising mixing an additive into the suspension of nanoparticles in the one-phase liquid mixture.

In another example, there is provided a method wherein the additive is a water soluble polymer.

In another example, there is provided a method wherein the water soluble polymer is polyethyleneglycol.

In another example, there is provided a method wherein the additive is graphene oxide.

In another example of the present disclosure, there is provided a porous monolith formed by the method described herein.

In another example of the present disclosure, there is provided a use of the porous monolith described herein in catalysis.

In another example of the present disclosure, there is provided a use of the porous monolith described herein as an electrode.

In another example of the present disclosure, there is provided a use of the porous monolith described herein in a fuel cell.

In another example of the present disclosure, there is provided a use of the porous monolith described herein for electrochemical energy storage.

In another example of the present disclosure, there is provided a use of the porous monolith described herein as a biomedical tissue scaffolding.

Generally, for a nanoparticle to be used in forming a bicontinuous intraphase jammed emulsion gel, the nanoparticle requires a large particle-particle Hamacker constant (~>3 in the phase of localization), a preference for one of two bicontinuous phases, and a screened electrostatic repulsion. Generally, for a liquid mixture to be used in forming a bicontinuous intraphase jammed emulsion gel, the liquid mixture must be able to undergo spinodal decomposition.

To gain a better understanding of the invention described herein, the following examples are set forth. It should be understood that these examples are for illustrative purposes only. Therefore, they should not limit the scope of this invention in anyway.

EXAMPLES

Example 1—a Flexible New Route to Dual Porosity Co-Continuous Membranes Via Bicontinuous Intraphase Jammed Emulsion Gels A new class of soft materials, bicontinuous intraphase jammed emulsion gels (bipjels), are described herein. This material provides a flexible and robust route for the preparation of bimodal co-continuous membranes that are generally considered ideal for (electro)catalytic and electrochemical energy storage applications.

Co-continuous materials with dual-scale porosity are ideal for a variety of catalytic and storage applications due to their optimization of both surface area and tortuosity. Preparing materials of this nature is inherently difficult, owing to thermodynamic instability of bicontinuous structures. Herein, a low-energy and flexible route to dual scale co-continuous materials via bicontinuous intraphase jammed emulsion gels is described, coined herein as bipjels. Alumina coated silica nanoparticles (NPs) were shown to stabilize bicontinuous emulsion gels formed by spinodal decomposition of water/2,6-lutidine (W/L) via a strong colloidal gel percolating the water-rich phase. Confocal-rheology captured real-time 3D images of bipjels during rheological testing, confirming kinetic arrest of spinodal decomposition and verifying enhanced strength afforded to bipjels by the intraphase colloidal. The prepared bipjels were tunable depending on pre-mixing conditions and particle concentration, as expected based on an understanding of colloidal gel percolation. Following bipjel formation, a free-standing co-continuous monolith of AlO—SiO NPs with meso- and macro-porosity was directly extractable by freeze-drying and characterized using electron microscopy.

Herein, an analogue was developed to the attractive nanoparticle stabilized bicontinuous polymer blends reported by Li et al.[24] using critical mixtures of fluids instead of polymers. These bicontinuous intraphase jammed emulsion gels, coined bipjels, have been derived using commercial nanoparticle dispersions with no additional tuning, and shown to have sufficient mechanical strength to enable isolation of a free-standing, hierarchical, co-continuous structure. Moreover, tuning of the domain sizes is achievable via both varying of the mixing regime prior to spinodal decomposition or particle concentration. Without wishing to be bound by theory, it is considered that this class of soft material may provide a platform for the development of materials for electrochemical energy storage and (electro) catalysis.

Formation of W/L bipjels was performed as per a typical W/L bijel procedure, whereby a critical W/L (~72 wt % water) mixture was prepared with a defined concentration of NPs and subjected to a temperature ramp to induce W/L demixing via spinodal decomposition.[15] The W/L mixtures began in the one-phase region at 30° C. and were rapidly quenched into the 2-phase region (lower critical solution temperature/LOST, 34.1° C.)[25] by heating to 55° C. at a rate of 25° C. per minute. The bipjels were prepared with a particle concentration of alumina-coated silica (AlO—SiO, Nissan Chemicals, Table 1) NPs of either 5 or 10 NP-wt %, corresponding to a volume fraction, φ, of 1.7% and 3.3% respectively, and the W/L/colloid dispersion mixed with either a low-energy vortex mixer or high-energy rotor stator homogenizer. The influence of particle concentration and premixing condition on local bipjel dynamics was evaluated by acquiring and analyzing time-resolved three-dimensional reflectance and fluorescence confocal images, with simultaneous rheological analysis (FIG. 1). As opposed to previous work, which studied emulsion gel rheology and morphology separately or only in two dimensions,[18,23,26] the utilized confocal rheology method enabled a more complete understanding of the synergy between a material's evolving structure and properties under the influence of the external force (e.g. temperature, shear). As seen in FIG. 1, above the lower critical solution temperature (LOST), the lutidine phase tagged with Nile red separated into bicontinuous domains with the water phase. Reflectance (shown in green) indicated that a percolating AlO—SiO NP network within the water phase was stabilizing these bicontinuous domains, with supporting evidence provided by the simultaneous rheological characterization, as detailed below. An example of separate reflectance and fluorescence images, prior to overlay, can be found in FIG. 4. Evolution of the loss moduli for all samples can be found in FIG. 5.

Figure 6A:
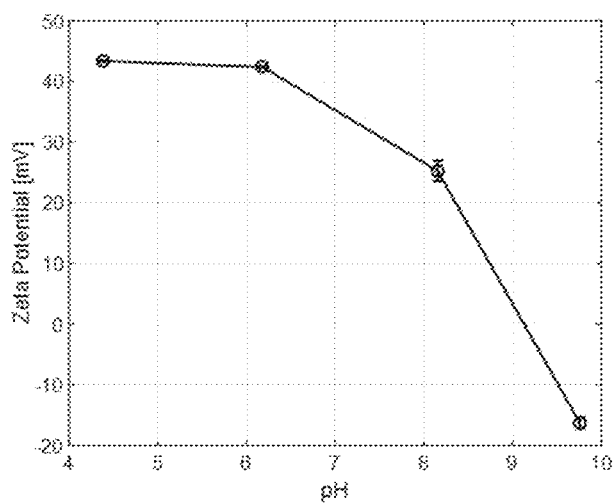
FIGS. 6A and 6B depict zeta potential titration analysis of SnowtekAK (AlO—SiO) nanoparticles. The pH of the water/lutidine mixture as described herein was approximately 9 (FIG. 6A), due to the acidic nature of the original sol, demonstrating that the NPs were near their point of zero charge in the W/L suspensions (FIG. 6B).
Figure 6B:
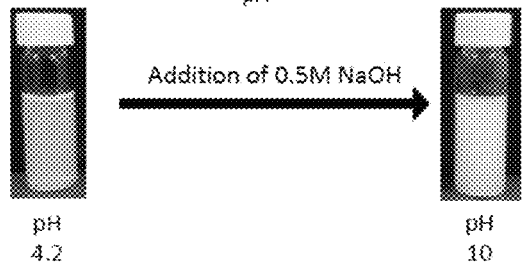

Prior to phase separation, an important feature of this system emerged—formation of an initial viscous colloidal gel of AlO—SiO NPs due to the near neutral surface charge of the NPs at the elevated pH of the W/L mixture. It was noted that the zeta potential titration data shown in FIG. 6 suggested that the surface interactions were heavily dominated by the AlO shell of the AlO—SiO NPs. The viscous gel was quantified using the method outlined by Wu and Morbidelli[27] and both the vortexed and homogenized solutions were seen to behave as "strong-link" gels with alpha values close to zero. See FIG. 7 and Table 2. Least square regression fitting was used to calculate the A and B coefficients for the linear equations presented in FIG. 7. These coefficients were subsequently used to determine the values of A, B, and $d_f$ using the equations below and assuming a value of 1.3 for x, the fractal dimension of the backbone which must be between 1-1.3 for colloidal gels, as presented in the work of Wu and Morbidelli.

$$A = \text{Slope of } \log(G') \text{ vs } \log(\varphi) = \frac{\beta}{d - d_f}$$

$$B = \text{Slope of } \log(\gamma) \text{ vs } \log(\varphi) = \frac{d - \beta - 1}{d - d_f}$$

$$\text{Where } \beta = (d - 2) + (2 + x)(1 - \alpha)$$

And where α is the coefficient between [0,1] that denotes whether a gel is considered a strong- (α=0) or weak-link (α=1) gel; d refers to the number of dimensions (d=3); $d_f$ is the estimated fractal dimension of the flocs, and x is the fractal dimension of the backbones, here assumed to be 1.3 as previously mentioned. The values found are summarized in Table 2.

Figure 8:
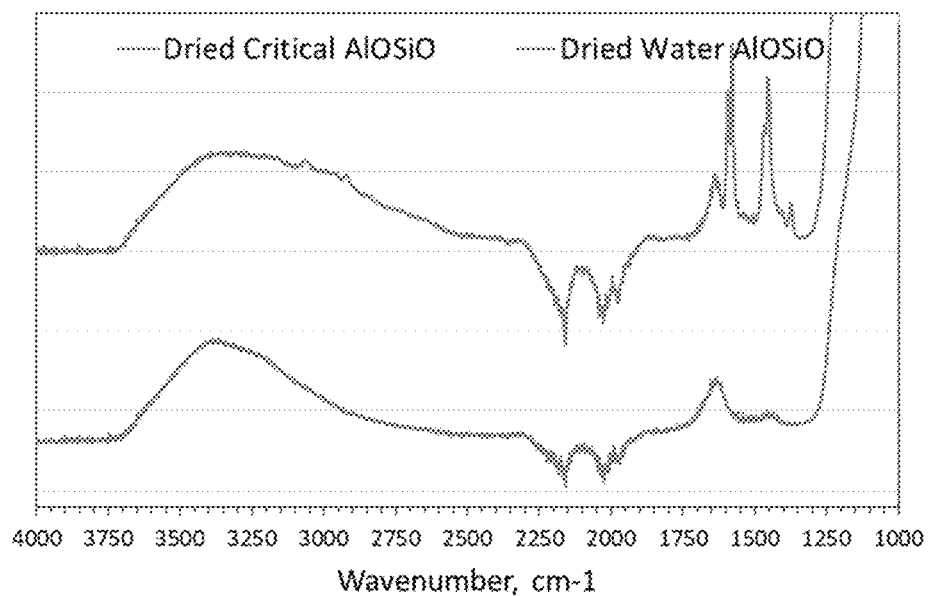
FIG. 8 depicts Fourier transform infrared spectroscopy analysis of dried AlO—SiO nanoparticles from either a critical W/L mixture (blue) or the initial water suspensions (orange).
Figure 9:
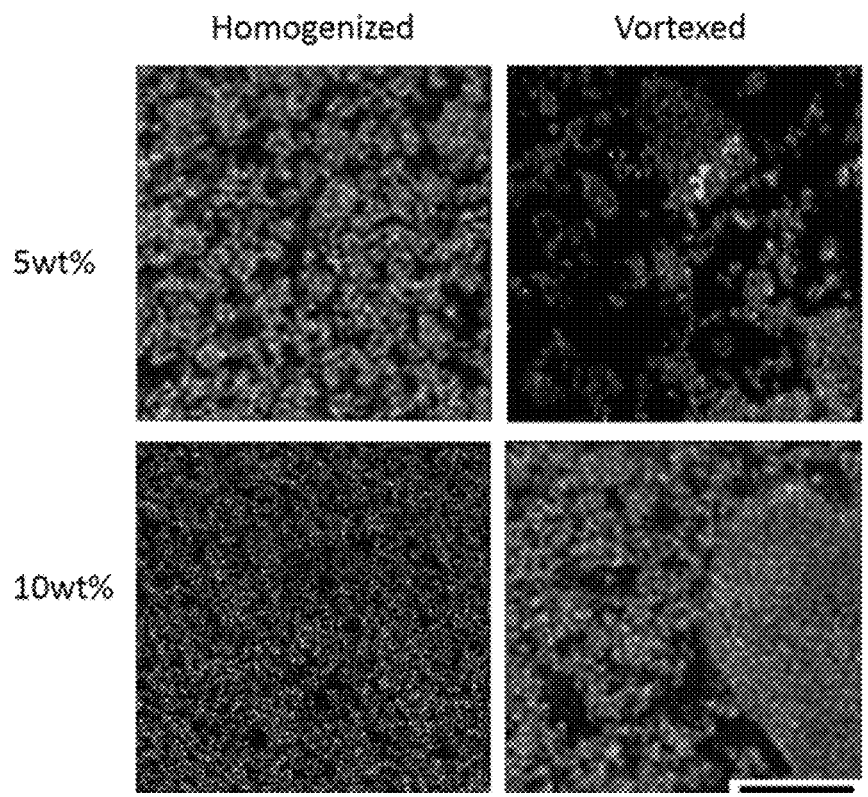
FIG. 9 depicts confocal reflectance images of the initial colloidal gels prior to phase separation. Green indicates the reflectance from the AlO—SiO NPs. Scale bar indicates 20 microns.

Furthermore, FTIR analysis of AlO—SiO NPs dried from either the original suspension or the W/L mixture suggested that NPs in the W/L mixture retained greater amounts of bound water, due to strong interactions with surface bound hydroxyl groups (FIG. 8).[28-31] Evidence of the strong-link AlO—SiO network was supported by confocal reflectance imaging of the AlO—SiO NPs, both pre- and post-phase separation (FIGS. 9 10), which showed flocculation and percolation of the AlO—SiO NPs throughout the W/L critical mixture and water domains, respectively. As demonstrated by Li et al. in attractive nanoparticle stabilized polymer blends, the wettability of particles must be carefully tuned to enable preferential wetting by one phase, but without that phase enabling uniform dispersion of the NPs and inhibiting their attractive interactions.[32] Without wishing to be bound by theory, it was considered that this was achieved here because of the propensity for nanoparticles to aggregate owing the relatively large alumina-alumina Hamacker constant ($A_{131}$ of ~4.2),[33] near neutral surface charge of the AlO—SiO NPs at the pH of the W/L mixture, enabling surface interaction, and the preferential wetting of the AlO—SiO NPs for the water phase, as governed by the surface charge and general wettability of the AlO—SiO NP dispersions.[34,35]

Figure 11:
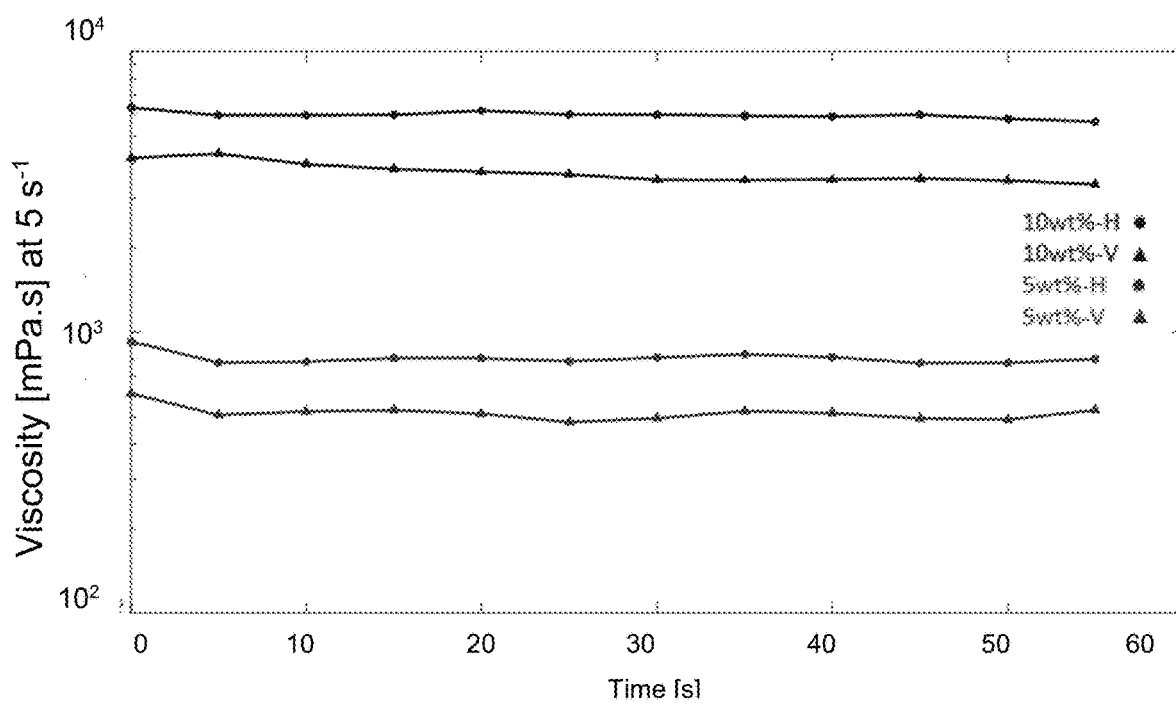
FIG. 11 depicts initial viscosity of the samples measured during the second pre-shear (5 s$^{-1}$) at 30° C. Homogenizing the samples increased the starting viscosity at similar particle concentrations.

Viscous AlO—SiO gels were further shown to impact the kinetics of phase separation upon heating (see FIG. 11 for viscosity data). During heating and at the onset of phase separation, there was a drop in the storage moduli for all bipjels, followed by a swift recovery and subsequent increase in the moduli. This behavior has been previously seen in the non-polar bijel system of styrene trimer and polybutene studied by Bai et al. and was suggested to be due to competition between the localization of particles at the interface (increase in G') and the shrinking interfacial area (reduction in G').[23] As the water and lutidine phases began to separate, the colloidal gel structure was disrupted as colloidal flocs are swept and sequestered into the water phase where they were then restricted. The behavior eventually resulted in a recovery in colloidal gel strength as the bicontinuous NP domains formed a compressed gel network upon heating. As the viscosity of the original suspension increased with increasing particle concentration, this drop happened at later times showing that this behavior was dependent on the system's particle concentration and floc formation. This trend countered that seen with the non-polar bijel system, where the drop in moduli occurred later for mixtures with lower concentrations of particles.[23] Importantly, this drop, recovery, and continual increase in storage moduli observed for bipjels was not seen in control samples of AlO—SiO NP suspensions prepared with either the addition of a simple base (NaOH) or the W/L gel mixture without heating above the LOST (FIG. 12).

As the bipjels were held above the LOST of the W/L mixture, the storage modulus continually increased in systems with stable bicontinuity, which has been seen in previous bijel systems due to particles jamming and rearranging along the interface.[23] Here, the overall upturn seen in G' was believed to be from both the phase separation of the water and lutidine and from compression of the colloidal gel within the water phase. The network formation and floc rearrangement within the water phase suggested by the initial drop, recovery, and continual increase in storage moduli was concluded to also contribute to the growth of the storage modulus during aging, allowing the bipjels to reach strengths higher than previously reported.[18] Upon cooling below the LOST, the W/L phases remix, however the strength of the resulting monogel remains, as seen in FIG. 1. The implications of this moduli behavior, which suggested that the bicontinuous templated networks remained intact after W/L re-mixing, are discussed in detail below.

Figure 10:
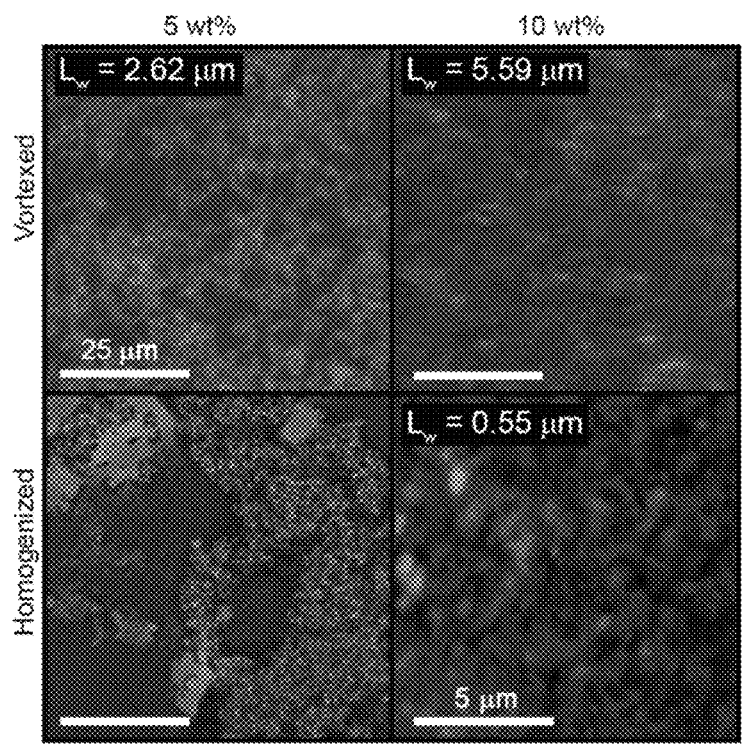
FIG. 10 depicts laser scanning confocal microscopy (LSCM) images of the 5 and 10 NP-wt % samples, with different pre-mixing conditions, at late stages of phase separation (t≈2000 s). The scale bar is 25 microns except for the 10 NP-wt % homogenized sample, where it is 5 microns. Lutidine is shown in red, NP-reflectance is shown in green and the remaining dark regions are the water phase.
Figure 13:
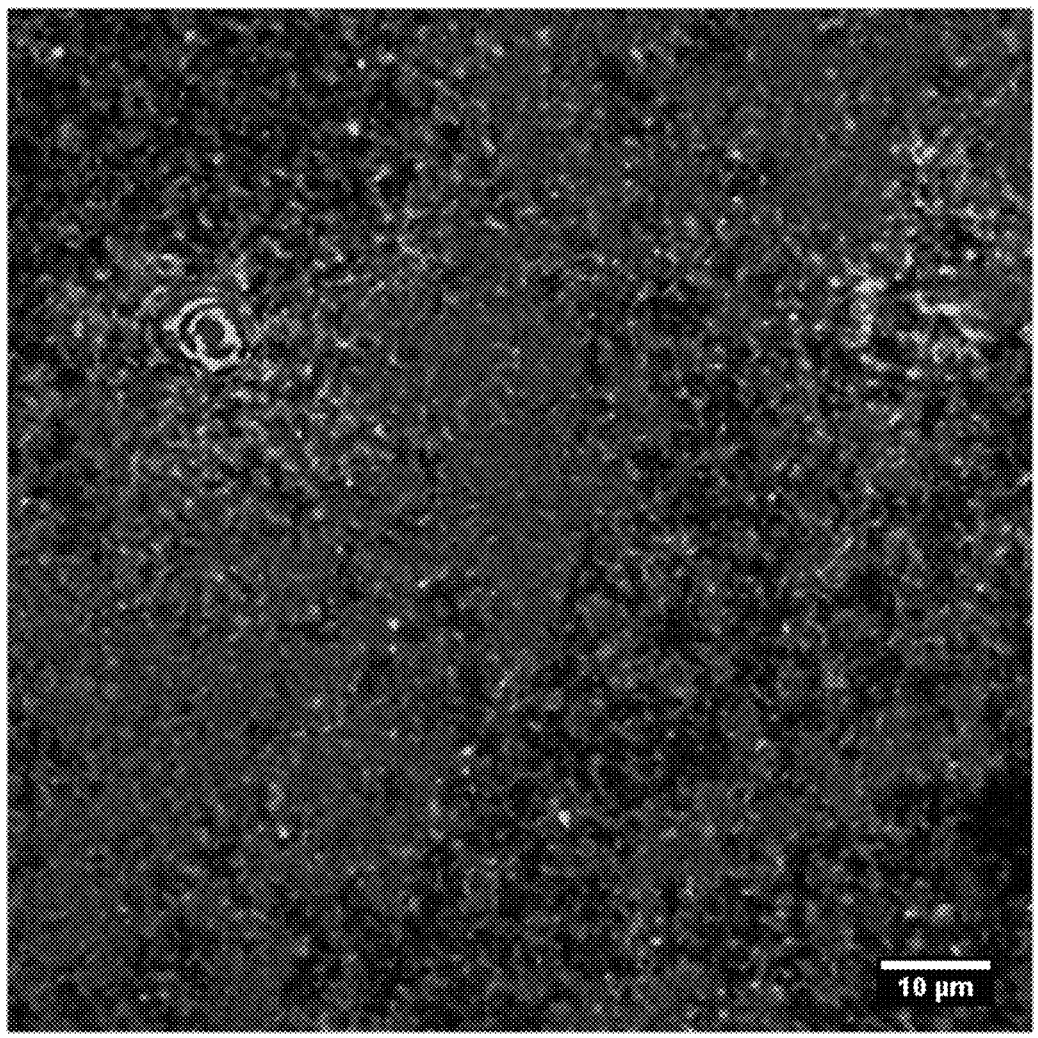
FIG. 13 depicts an early image of the 5 NP-wt % homogenized sample at t≈700 seconds showing initial small phase domains. These domains eventually coarsened to large droplets as the dense flocs were unable to stabilize the surface.
Figure 14A:
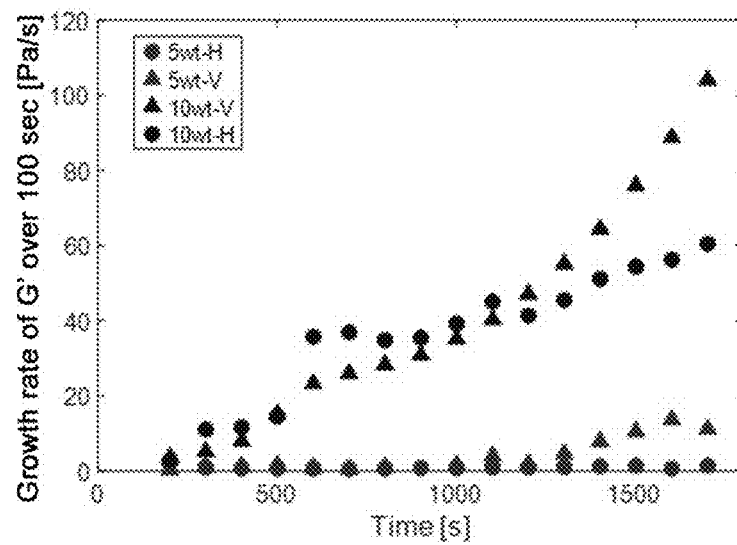
FIGS. 14A and 14B depict plot of storage moduli slope versus time held at T=55° C.
Figure 14B:
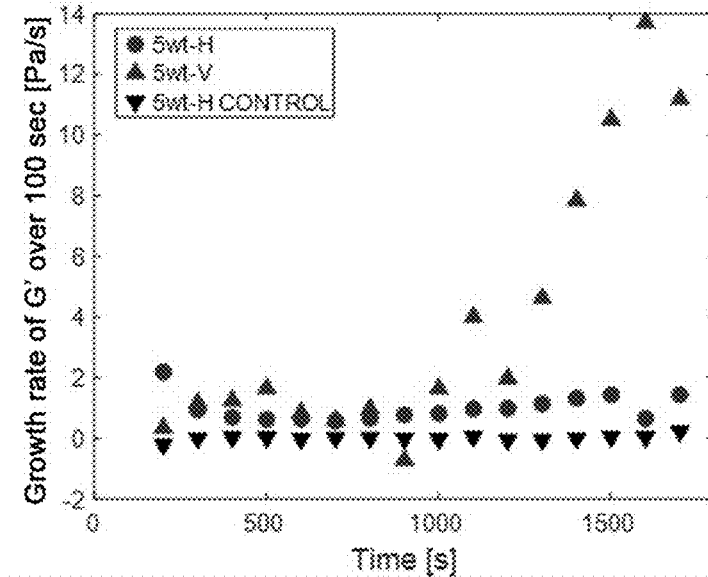

The spatiotemporal image data showed a clear dependence of bipjel structure on the initial concentration of AlO—SiO NPs and the amount of energy inputted into the mixing of the initial colloidal gel. The bicontinuous domains in FIG. 1 and FIG. 10 were seen to persist throughout the temperature hold period for all but the 5 NP-wt % homogenized sample shown. For systems with a lower weight fraction of NPs (5 NP-wt %) mixed via vortexing, the bipjels had water domains with an average object thickness, $L_w$, of 3.2 μm (+/−0.2 μm) after 2000s held above the LOST. Information on how $L_w$ was calculated can be found in the methods section. For systems with a lower weight fraction of NPs (5 NP-wt %) mixed via homogenization, bicontinuous domains with a smaller $L_w$ of 0.87 μm (+/−0.1 μm) (700 s of heating) were initially formed (see FIG. 13), but these domains were not stable and eventually coarsen to droplets as shown in FIG. 10. Correspondingly, the storage modulus of the 5 NP-wt % homogenized sample increased quickly after phase separation but exhibited a significantly lower growth rate in G' while held above the LOST beyond t~1000s. Further discussion of the growth rates for the storage moduli of the various samples is provided in respect of FIG. 14. The inability of the 5 NP-wt % homogenized sample to stabilize the bicontinuous domains was suggested to result from differing particle aggregate size formed during mixing of the NP-W/L mixtures and subsequent differences in density of AlO—SiO NP agglomerates within the bipjel structures. Agglomerates formed during initial addition of lutidine to the water-NP suspension were loosely flocculated and highly non-uniform, owing to the short time-scale of their formation and the convective mixing that occurred. Vortex mixing provided a relatively low shear environment for the breaking and reformation of flocs, while rotor-stator homogenization enabled more rearrangement and more compact final flocs through higher shear.[36] The average object thickness of the lutidine and water domains and particle packing density was governed by the initial floc size; for the vortexed samples with larger flocs, larger domains were formed and the lower surface area co-continuous water phase remained stable. Meanwhile in the homogenized 5 NP-wt % sample, small domains with a correspondingly high surface area initially formed, which became unstable due to the inability of the dense NP flocs to percolate the entire water phase. For 10 NP-wt % homogenized samples, the smaller agglomerates again formed smaller co-continuous domains ($L_w$=0.55+/−0.03 μm, t=2000 s, see FIG. 10), now with the concentration being sufficient to percolate the entire water phase and prevent coarsening to droplets during the temperature hold. Meanwhile, the 10 NP-wt % vortexed samples had the largest water domains of $L_w$=5.6 μm (+/−1 μm) at 2000 s (FIG. 10), due to the combination of large floc size and high concentration which limited compaction of the water phase.

Figure 2B:
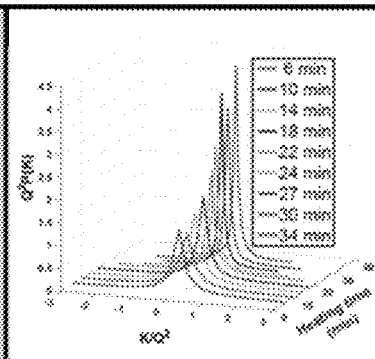
Figure 2C:
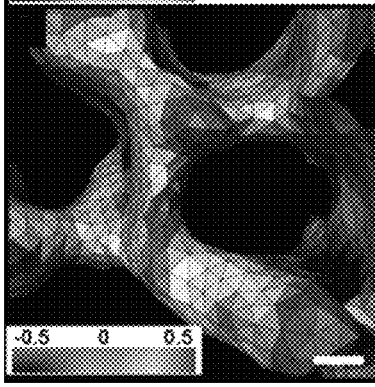
Figure 2D:
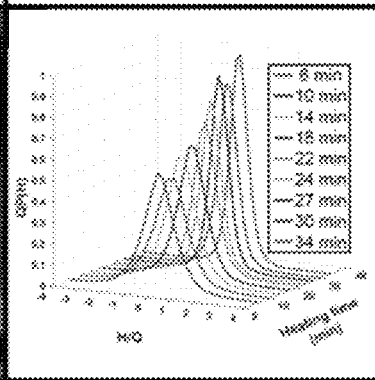
Figure 15:
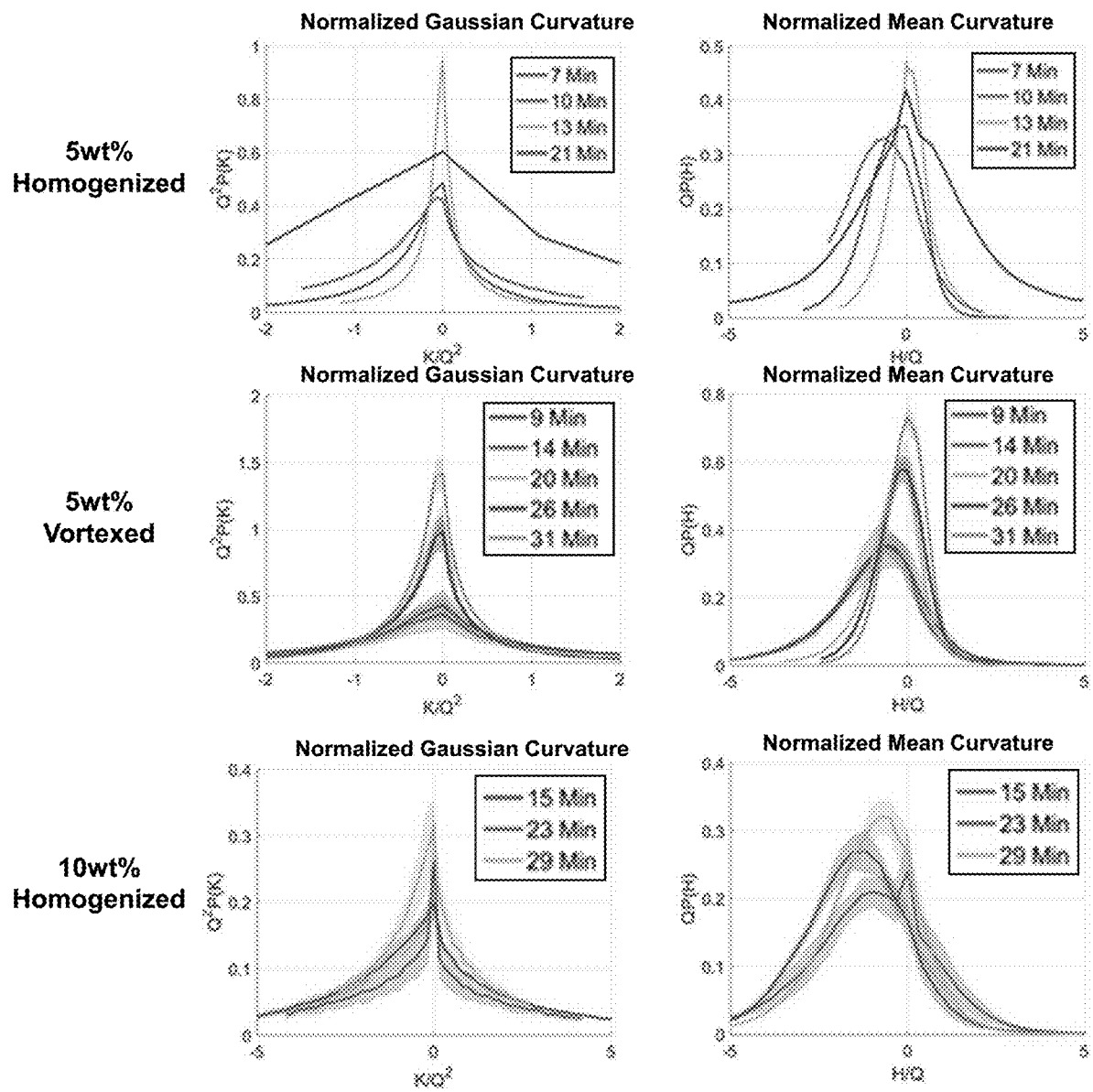
FIG. 15 depicts curvature distributions over time for the 5 NP-wt % homogenized, 5 wt % vortexed, and 10% homogenized samples. The shading indicates the standard deviation of the samples' curvature distributions (see Methods for procedure). Shading was omitted from the 5 NP-wt % homogenized samples due to the large error seen at the end of heating as bicontinuous domains were no longer stable.

To better understand the quality of the bipjel structures for further utilization, curvature analysis was performed in a similar method as has been used in previous bijel studies[37] (see Methods). The mean curvature evolution during heating further supported that a percolating particle network was affecting domain formation (see FIG. 2). The initial negative skew of the mean curvature was towards the water phase, suggesting that the particle network was imposing preferential curvature on the early bipjel structures. As the sample was aged further, the mean curvature distribution shifted positive (towards the lutidine phase) as expected for the minor (lutidine) phase,[25] shifting from a negatively centered normalized mean curvature at 6 minutes to a positively centered distribution at 34 minutes. Additionally, Gaussian curvature analysis (FIG. 2b) was seen to follow similar trends shown in previous bijel reports,[37] with the narrowing of the normalized Gaussian distribution during aging indicating increased hyperbolic character. The remaining bipjel samples underwent similar trends in curvature evolution, as summarized in FIG. 15, suggesting consistency in the mechanism of formation with varying floc size and NP concentrations. The evolution of the bipjel curvature towards the ideal hyperbolic shape demonstrated that while the initial bipjel structure may be biased, spinodal decomposition was able to eventually dominate the final curvature. In comparison to direct mixing bijels, bipjels exhibited near ideal curvature due to the driving force of spinodal decomposition.

Figure 3A:
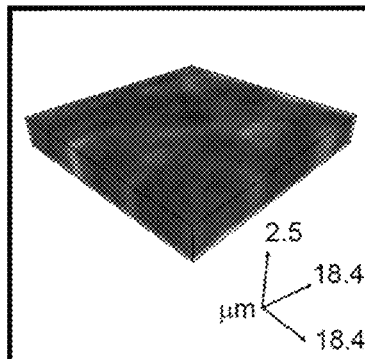
FIGS. 3A-3D depict three dimensional reconstruction of laser scanning confocal microscope images for (FIG. 3A) 10 NP-wt % vortex mixed W/L bipjels and (FIG. 3C) 10 NP-wt % rotor stator homogenizer mixed W/L bipjels, with red representing Nile red tagged lutidine and green representing reflection from the AlO—SiO NPs. Scanning electron microscopy images of dried co-continuous materials formed through bipjel templating for the same bipjel mixtures are shown in (FIG. 3B) and (FIG. 3D), respectively. The inset in (FIG. 3B) has a scale bar of 200 nm, demonstrating the mesoporosity at the surface of the particle-formed materials.
Figure 3B:
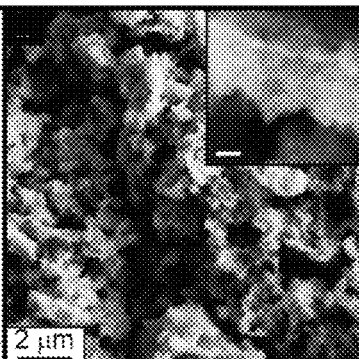
Figure 3C:
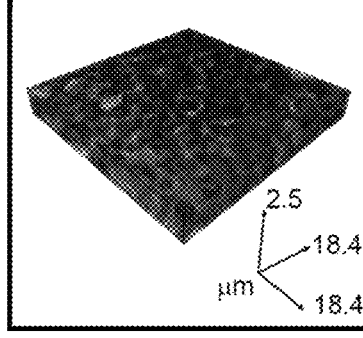
Figure 3D:
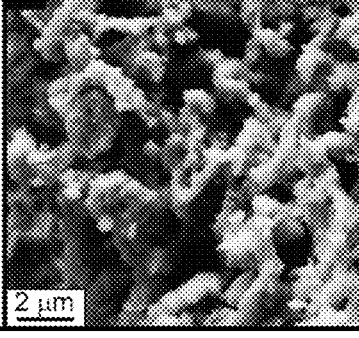
Figure 4A:
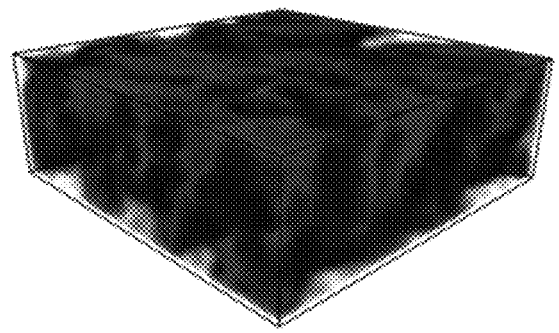
FIGS. 4A-4C depict three dimensional renderings of the (FIG. 4A) reflection/AlO—SiO NP, (FIG. 4B) Nile red/lutidine and (FIG. 4C) overlayed channels from the 5 wt % vortexed samples.
Figure 4B:
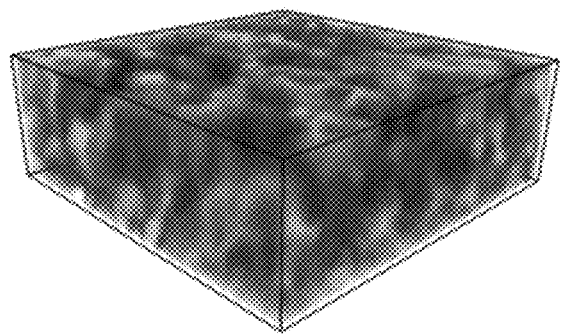
Figure 4C:
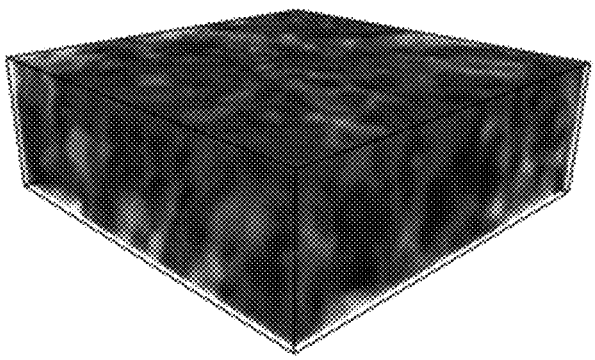
Figure 5A:
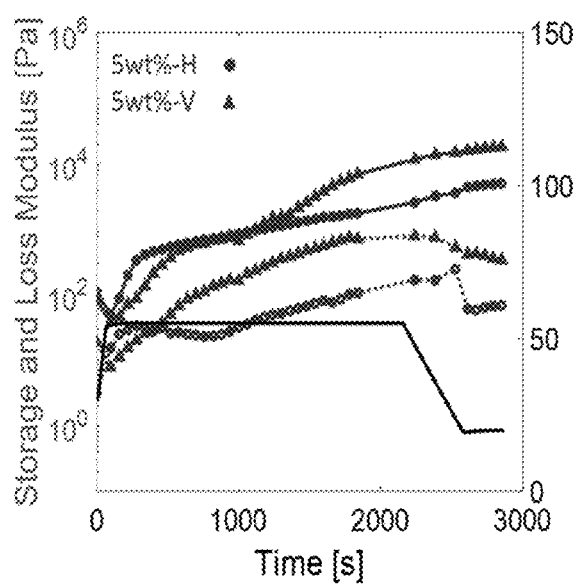
FIGS. 5A and 5B depict storage (solid) and loss (dotted) moduli for the (FIG. 5A) 5 NP-wt % and (FIG. 5B) 10 NP-wt % bipjels.
Figure 5B:
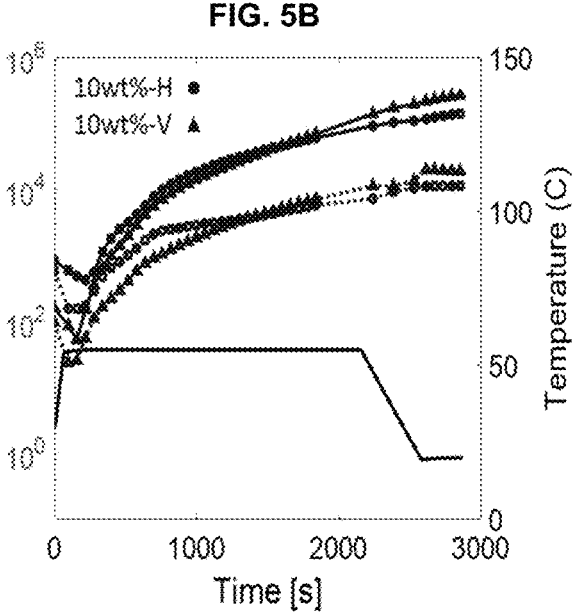
Figure 16:
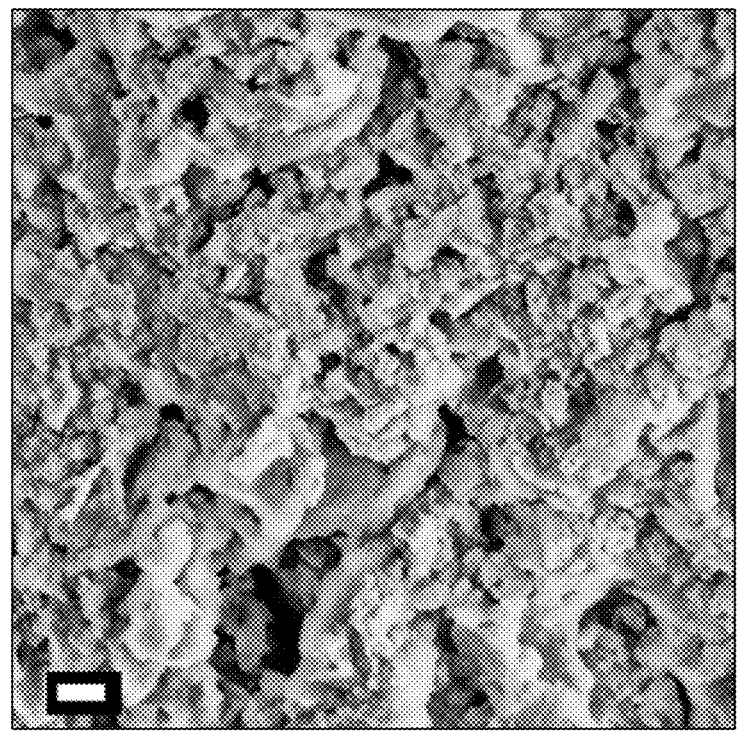
FIG. 16 depicts a representative scanning electron microscopy image of a dried 10 NP-wt % vortexed sample which was not subjected to spinodal decomposition, indicating a lack of co-continuity and a general dis-similar appearance to that sample subject to spinodal decomposition. White scale bars indicate 1 micron.

A final and key observation for this system was that both the morphology and strength of the bipjel-templated AlO—SiO colloidal gel persisted upon cooling and remixing of the W/L phases (see FIG. 1). Indeed, this templated gel could be isolated from the liquid phase as a free-standing bimodally porous material via quenching of the W/L bijel in liquid nitrogen and subsequent drying at room temperature under vacuum (FIG. 3). The 10 NP-wt % samples were chosen for drying due to their higher strength and because both mixing methods led to successful bipjel creation. This porous structure was shown to differ from that of a dried AlO—SiO gel (not subjected to bicontinuous domain formation, FIG. 16). The average object thickness of the 10 NP-wt % homogenized samples were shown to be comparable for both LSCM (FIG. 3c) and SEM (FIG. 3d) at 0.55 and 0.57 μm, respectively. The vortexed domain size saw considerable shrinkage (from 5.6 μm under LSCM, to 0.58 μm with SEM), which is proposed to be due to the looser flocs and their inherent porosity that were more readily observed with the higher resolution provided by the SEM. From the SEM images, the isolated structures were observed to exhibit both macroporosity in the main voids, as well as mesoporosity when observing the NP-network. The colloidal gel mixing technique was further seen to influence the resulting bimodally porous structures isolated from the 10 NP-wt % bijels as shown in FIG. 4. The vortexed samples had less uniform domain sizes, with larger pockets of the water phase present among regions with smaller lutidine domains as shown with LSCM (FIG. 3a). This resulted in a rougher surface under SEM (FIG. 3b) when compared with the homogenized samples, which had more uniform domain formation as shown in the LSCM and SEM imaging. This further supported the proposed floc stabilization hypothesis with the looser, more irregular flocs in the vortexed samples stabilizing larger, rougher structures than the smaller, more regular flocs formed after homogenization.

Figure 17:
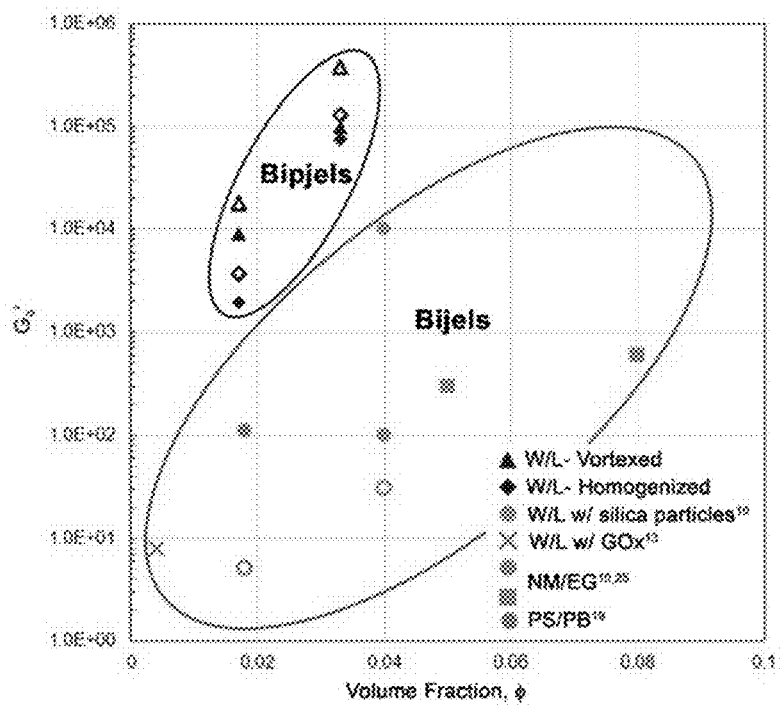
FIG. 17 depicts comparison of the zero-shear storage modulus of previous bijel (closed symbols) and monogel (open symbols) systems compared to the bipjel systems prepared as described herein at various volume fractions. Values for the previous works taken from references[18,23,38,39].
Figure 19:
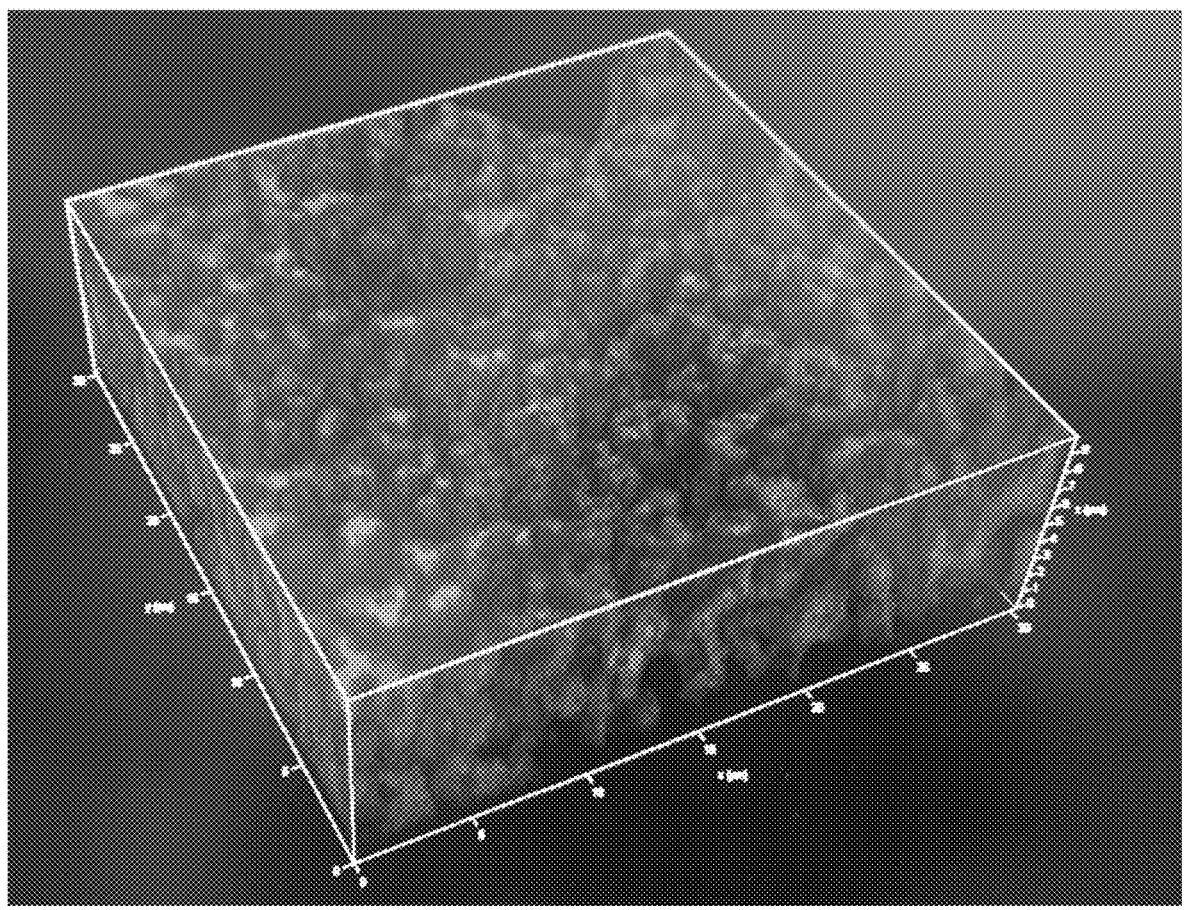
FIG. 19 depicts three-dimensional volume renderings of laser scanning confocal microscopy (LSCM) images W/L stabilized with Al—Si (5 wt %) and polyethyleneimine (1 wt %) as additive.

Bimodally porous materials with consistent macroporous channel widths are highly desired for a number of applications ranging from biomedical tissue scaffolding to electrocatalysis. The new method presented herein to stabilize bicontinuous emulsion gels, using networked intraphase particles (bipjels), provide a pathway for advanced material synthesis. It is considered that bipjels may offer a more direct pathway for material isolation than traditional interface stabilized emulsion gels (bijels) as no additional monomer needs to be introduced to the system for formation of a free-standing structure. FIG. 17 shows the bipjel system studied in this work compared to other bijel systems that have also been rheologically studied.[18,23,38,39] The derived bipjels have higher storage moduli at lower volume loadings of stabilizing particles than other bijel systems. This enhanced strength enabled bipjels to stabilize co-continuous morphologies at lower particle loadings with improved mechanical properties than with interface emulsion gel stabilization.

Experimental Section

Particle Characterization:

A Malvern Zetasizer with Autotitration unit was used to perform a zeta-titration of the original AlO—SiO (SnowtexAK) nanoparticle suspensions provided by Nissan Chemicals (see Table 1 for properties). The suspension was diluted down to 0.5 wt % $SiO_2$ content, and was titrated from the original pH to a pH of 10. The pH was adjusted with a 0.1 M NaOH solution—4 different pH values were measured and 3 measurements of the zeta potential were taken at each point for standard deviation calculations. Fourier transform infrared spectroscopy was performed using an Agilent MicroLab spectrometer on AlO—SiO NPs which had been dried for ~2 hours at 50° C.

Bipjel Formation:

Bipjels were prepared at the critical composition of 2,6-lutidine and water with AlO—SiO nanoparticle suspensions. The original suspension was diluted into the water phase at 5, 10 wt % silica content ($\varphi$=1.7% and 3.3% respectively, herein denoted as 5 or 10 NP-wt %) with Millipore water. 2,6-Lutidine, tagged with Nile Red for imaging, was added after the dilution to bring the mixture to the critical composition (volume ratio L:W=30:70). Samples were then mixed one of two ways: "low-energy" vortex mixing (Fisher Mini Vortexer, 120 V), or with a "high-energy" rotor stabilized homogenizer (PRO Scientific Bio-Gen Series PRO200). For vortexed samples, 1.5 mL of bipjel solutions were vortexed on the highest setting for approximately 30 seconds; for homogenized samples, 2.5 mL of bipjel solutions were alternatively vortexed and homogenized for approximately 30 seconds of total mixing time (the vortex steps were required to bring the sample to the bottom of the centrifuge tube throughout the homogenization). Mixed samples were then heated as described below for the various experiments.

Confocal-Rheology:

Bipjels were imaged using a 25× water immersion objective or a 63× oil immersion objective and 552 nm laser on a Leica SP8 LSCM equipped with a periscope arm (LSM Tech) and piezo stage (Piezosystem Jena). The 552 nm laser was also used to capture reflectance of the AlO—SiO NP throughout imaging. To prevent immersion liquid evaporation a gel solution with matching refractive index was used in place of water for the 25× objective. Samples were imaged from below the coverslip on a Peltier stage on an Anton Paar MCR 302 WESP rheometer. Samples were loaded onto the coverslip at room temperature. Rheological testing included a 60 second preshear step ($\dot{\gamma}$=5 $s^{-1}$) at 30° C. with a 25 mm parallel plate geometry. Samples were then probed with a frequency sweep, from f=100 to 0.1 Hz at a strain of $\gamma$=0.5%. The sample was then presheared again for 60 second ($\dot{\gamma}$=5 $s^{-1}$) at 30° C. Following this the sample was quenched into the 2-phase region by heating at 25° C. $minute^{-1}$ to 55° C. where it was aged for 30 minutes. Samples were then probed again with a frequency sweep, from f=100 to 0.1 Hz at a strain of $\gamma$=0.5%. The sample was then cooled at 5° C. $minute^{-1}$ to 20° C. to observe monogel formation and stability for 15 minutes. Samples were then probed a final time with a frequency sweep, from f=100 to 0.1 Hz at a strain of $\gamma$=0.5%. These frequency sweeps were used to probe the solid-like properties of the bipjels at various stages. Throughout the time sweep processes, the storage and loss moduli were monitored every 1 s with a constant oscillatory strain, $\gamma$=0.5% at a frequency, f=1 Hz, to perform a time sweep test to see structure evolution as the sample was taken to important temperatures for the critical W/L system. Confocal imaging occurred throughout this test. Stacks of 2D images, covering ~30 microns in the z-direction, took 1-2 minutes to acquire, depending on the averaging used to improve the signal to noise ratio, and a step size of 400 nm (25×) or 255 nm (63×) was used.

Image Processing:

Post-processing and image quantification was done using Avizo 9.3 software (CMC Microsystems). The fluorescent channels were deconvoluted and then a 3D median filter was applied to reduce noise. Images acquired with the 63× objective were additionally processed with a Gaussian filter prior to median filtering to further reduce noise from the higher magnification. Following this, each image's histogram was normalized to minimize brightness variation as the lasers penetrated deeper into the samples. This step also helps correct for possible photo-bleaching that may occur during confocal-rheology imaging as the same region is scanned many times. Following this, the samples were thresholded at similar values (possible due to the normalized brightness), a filter was applied to remove small spots contributing to noise, the inverse of the image was taken, and the cylinder-rod model (see Equation 1) was applied to calculate the average object thickness of the water-rich domains.

$$\text{Average Object Thickness} = L_W = \frac{4}{Obj \cdot S / Obj \cdot V} \quad \text{Equation 1}$$

Where Obj.S/Obj.V is the surface to volume ratio. For the SEM image samples, distance mapping through Avizo's Auto-Skeleton module was used to calculate the domain sizes from the 2D image. The generated value corresponded to a radius measurement and so was doubled for the total channel width. To calculate the errors, images were divided into quadrants and the surface area to volume ratio was calculated for each time step. The percent error found from the standard deviation of the four quadrants was applied to the average object size calculation for the reported times.

Curvature Analysis:

To analyze the curvature of the structures, a different image processing pathway was used to extract the surfaces. Image stacks were divided into 4 quadrants after the thresholding and filtering steps mentioned above. An isosurface was then created. During this step, it was possible to down sample the image for ease of computation, however, for all but the 10 NP-wt % vortexed samples, this step could be avoided through dividing the stacks into equally sized quadrants. Dividing into quadrants also allowed to calculate the standard deviation of the distributions within the individual images. The surface was extracted and remeshed for best isotropic vertex placement. Then the surface was smoothed by shifting the vertices to the average position of its neighbors. The mean (H) and Gaussian (K) curvatures were then calculated (see equations 2-3) from the triangles' principle orthogonal curvatures ($\kappa_1$ and $\kappa_2$), and the area probability distributions were calculated using Equations 4-5.

$$H = \frac{\kappa_1 + \kappa_2}{2} \quad \text{Equation 2}$$

$$K = \kappa_1 * \kappa_2 \quad \text{Equation 3}$$

$$P_H(H) = \frac{\sum_{i=1}^{N} A\left(i \middle| H - \frac{\Delta H}{2} \leq H_i < H + \frac{\Delta H}{2}\right)}{\Delta H \sum_{i=i}^{N} A_i} \quad \text{Equation 4}$$

$$P_K(K) = \frac{\sum_{i=1}^{N} A\left(i \middle| K - \frac{\Delta K}{2} \leq K_i < K + \frac{\Delta K}{2}\right)}{\Delta K \sum_{i=i}^{N} A_i} \quad \text{Equation 5}$$

Where A refers to the area of a triangle on the surface. These distributions were normalized to the interfacial area per unit volume ratio, Q, for the mean, and $Q^2$, for the Gaussian curvatures.

Monolith Creation:

Porous monoliths were created directly from the networked AlO—SiO bipjels. 2.5 mL of the initial 10 wt % vortexed and homogenized bipjel mixtures were prepared as described and then placed into 4 mL glass vials. This vial was then quenched into the two-phase region by placing it in a 55° C. oil bath (the approximate heating rate was measured to be 12° C. min$^{-1}$). It was kept in the oil bath for 20 minutes, before the networked bipjel was rapidly frozen by submerging the vial in a liquid nitrogen bath. The vial was readily placed into a vacuum chamber, and the water and lutidine were removed over 18 hours. The sample was then removed and imaged in a Zeiss Sigma VP scanning electron microscope. For the 10 NP-wt % vortexed control test, the sample was prepared the exact same way only it was not subjected to heating in the oil bath.

TABLE 1

Manufacturer specifications for AlO—SiO (SnowtekAK) nanoparticles.

| Property | Value |
| --- | --- |
| SiO$_2$ Content | 17.8% |
| Al$_2$O$_3$ Content | 2.0% |
| pH | 4.8 |
| Viscosity at 25° C. | 3.9 [mPa · s] |

TABLE 2

Summary of the parameter values found to fit the above equations for the initial vortexed and homogenized mixtures.

| | A | B | d | d$_f$ | β | α | x |
| --- | --- | --- | --- | --- | --- | --- | --- |
| Vortexed | 3.04 | −1.49 | 3 | 1.7 | 3.9 | 0.12 | 1.3 |
| Homogenized | 3.99 | −1.99 | 3 | 2.0 | 4.0 | 0.09 | 1.3 |

REFERENCES

[1] Y. Yue, H. Liang, *Small Methods* 2018, 2, 1800056.
[2] S. Chabi, C. Peng, D. Hu, Y. Zhu, *Adv. Mater.* 2014, 26, 2440.
[3] P. Trogadas, V. Ramani, P. Strasser, T. F. Fuller, M.-O. Coppens, *Angew. Chemie Int. Ed.* 2016, 55, 122.
[4] S. Huang, L. Bai, M. Trifkovic, X. Cheng, C. W. Macosko, *Macromolecules* 2016, 49, 3911.
[5] H. Zhang, A. I. Cooper, *Soft Matter* 2005, 1, 107.
[6] J. A. Witt, D. R. Mumm, A. Mohraz, *J. Mater. Chem. A* 2016, 4, 1000.
[7] B. K. Pilapil, J. van Drunen, Y. Makonnen, D. Beauchemin, G. Jerkiewicz, B. D. Gates, *Adv. Funct. Mater.* 2017, 27, 1703171.
[8] O.-H. Kim, Y.-H. Cho, S. H. Kang, H.-Y. Park, M. Kim, J. W. Lim, D. Y. Chung, M. J. Lee, H. Choe, Y.-E. Sung, *Nat. Commun.* 2013, 4, 2473.
[9] A. Fischer, Y.-S. Jun, A. Thomas, M. Antonietti, *Chem. Mater.* 2008, 20, 7383.
[10] M. N. Lee, A. Mohraz, *J. Am. Chem. Soc.* 2011, 133, 6945.
[11] K. Nakanishi, *J. Porous Mater.* 1997, 4, 67.
[12] † Junko Konishi, * Koji Fujita, ‡ and Kazuki Nakanishi, K. Hiraot †, *Chem. o* 2006, 18, 864.
[13] Y. Gao, J. Kim, M. E. Helgeson, *Soft Matter* 2015, 11, 6360.
[14] P. J. Lu, E. Zaccarelli, F. Ciulla, A. B. Schofield, F. Sciortino, D. A. Weitz, *Nature* 2008, 453, 499.
[15] E. M. Herzig, K. A. White, A. B. Schofield, W. C. K. Poon, P. S. Clegg, *Nat. Mater.* 2007, 6, 966.
[16] C. Huang, J. Forth, W. Wang, K. Hong, G. S. Smith, B. A. Helms, T. P. Russell, *Nat. Nanotechnol.* 2017, 12, 1060.
[17] J. A. Witt, D. R. Mumm, A. Mohraz, 2016, 4, 1000.
[18] M. N. Lee, J. H. J. Thijssen, J. A. Witt, P. S. Clegg, A. Mohraz, *Adv. Funct. Mater.* 2013, 23, 417.
[19] M. N. Lee, A. Mohraz, *Adv. Mater.* 2010, 22, 4836.
[20] K. A. White, A. B. Schofield, B. P. Binks, P. S. Clegg, *J. Phys. Condens. Matter* 2008, 20, 494223.
[21] K. A. White, A. B. Schofield, P. Wormald, J. W. Tavacoli, B. P. Binks, P. S. Clegg, *J. Colloid Interface Sci.* 2011, 359, 126.
[22] P. M. Welch, M. N. Lee, A. N. G. Parra-Vasquez, C. F. Welch, *Langmuir* 2017, 33, 13133.
[23] L. Bai, J. W. Fruehwirth, X. Cheng, C. W. Macosko, *Soft Matter* 2015, 11, 5282.
[24] L. Li, C. Miesch, P. K. Sudeep, A. C. Balazs, T. Emrick, T. P. Russell, R. C. Hayward, *Nano Lett.* 2011, 11, 1997.
[25] C. a Grattoni, R. a Dawe, C. Y. Seah, J. D. Gray, *J. Chem. Eng. Data* 1993, 38, 516.
[26] J. W. Tavacoli, J. H. J. Thijssen, A. B. Schofield, P. S. Clegg, *Adv. Funct. Mater.* 2011, 21, 2020.
[27] H. Wu, M. Morbidelli, *Langmuir* 2001, 17, 1030.
[28] C. Li, M. Akinc, *J. Am. Ceram. Soc.* 2005, 88, 1448.

[29] M. E. Karaman, R. M. Pashley, T. D. Waite, S. J. Hatch, H. Bustamante, *Colloids Surfaces A Physicochem. Eng. Asp.* 1997, 129-130, 239.

[30] W. Ducker Virginia Tech, D. R. Clarke, J. Israelachvili, W. A. Ducker, J. N. Israelachvili, n.d., DOI 10.1111/j.1151-2916.1994.tb07012.x.

[31] M. Polat, K. Sato, T. Nagaoka, K. Watari, *J. Colloid Interface Sci.* 2006, 304, 378.

[32] L. Li, C. Miesch, P. K. Sudeep, A. C. Balazs, T. Emrick, T. P. Russell, R. C. Hayward, *Nano Lett.* 2011, 11, 1997.

[33] S. Lu, R. J. Pugh, E. Forssberg, in *Stud. Interface Sci.*, Elsevier, 2005, pp. 172-244.

[34] P. D. Gallagher, J. V. Maher, *Phys. Rev. A* 1992, 46, 2012.

[35] P. D. Gallagher, M. L. Kurnaz, J. V. Maher, *Phys. Rev. A* 1992, 46, 7750.

[36] V. Oles, *J. Colloid Interface Sci.* 1992, 154, 351.

[37] M. Reeves, K. Stratford, J. H. J. Thijssen, *Soft Matter* 2016, 12, 4082.

[38] J. a. Witt, D. R. Mumm, A. Mohraz, *Soft Matter* 2013, 9, 6773.

[39] L. Imperiali, C. Clasen, J. Fransaer, C. W. Macosko, J. Vermant, *Mater. Horiz.* 2014, 1, 139.

Example 2

Technologies such as bioreactors, fuel cells, batteries, electrolyzers, heterogeneous catalysts, synthetic tissue scaffolding, flow batteries, supercapacitors and metamaterials all suffer from a similar issue: kinetic losses.

Kinetic losses are the sum of all losses which occur in a system resulting from kinetic deficiencies (losses in efficiency that do not result from those inherent to the materials). For example, a fuel cell has a theoretical efficiency upwards of 70% with currently designed materials (that is, a polymer ionomer for proton transport, conductive porous carbon-based support, and platinum alloy nanocatalysts). In stacks where fuel cells are used to power electrical devices, fuel cells achieve closer to 20% efficiency. Therefore, overcoming kinetic losses has the potential to improve device efficiencies 100's of percent (e.g. a battery or fuel cell that can last 2 to 3 times longer with the same materials, with a smaller footprint and greater power output).

In some examples, there is provided a porous nanocomposite and use thereof, that is a composite material of a binder (e.g. polymer) and a solid nanoparticle, components (e.g. membranes and electrodes) for applications in both mobile and large-scale (e.g. grid-scale): Fuel Cells, Electrochemical Desalination, Redox Flow Batteries, Photovoltaics, Flow Batteries, Electrolyzers, Porous Scaffolds (e.g. bio-reactors, catalysis, tissue regeneration, injectable stents), Lithium Ion Batteries, and/or Supercapacitors (e.g. conductive polymer/nanoparticle nano-composite based supercapacitors).

The embodiments described herein are intended to be examples only. Alterations, modifications and variations can be effected to the particular embodiments by those of skill in the art. The scope of the claims should not be limited by the particular embodiments set forth herein, but should be construed in a manner consistent with the specification as a whole.

All publications, patents and patent applications mentioned in this Specification are indicative of the level of skill those skilled in the art to which this invention pertains and are herein incorporated by reference to the same extent as if each individual publication patent, or patent application was specifically and individually indicated to be incorporated by reference.

The invention being thus described, it will be obvious that the same may be varied in many ways. Such variations are not to be regarded as a departure from the spirit and scope of the invention, and all such modification as would be obvious to one skilled in the art are intended to be included within the scope of the following claims.

What is claimed is:

1. A method of forming a bicontinuous intraphase jammed emulsion gel, the method comprising
   providing a suspension of nanoparticles in a one-phase liquid mixture comprising forming the one-phase liquid mixture from a pre-determined ratio of a first liquid and a second liquid, wherein the first liquid is water (W) and the second liquid is 2,6-lutidine (L); and
   triggering spinodal decomposition of the one-phase liquid mixture to form a two-phase liquid mixture,
   the nanoparticles aggregating into one phase of the two-phase liquid mixture to form a bicontinuous intraphase jammed emulsion gel (BIPJEL).

2. The method of claim 1, further comprising isolating the BIPJEL as a porous monolith.

3. The method of claim 1, wherein forming the one-phase liquid mixture from a predetermined ratio of a first liquid and a second liquid comprises selecting the first liquid and the second liquid to undergo spinodal decomposition.

4. The method of claim 1, wherein the pre-determined ratio is approximately 70:30 W/L; or approximately 72:28 W/L.

5. A method of forming a bicontinuous intraphase jammed emulsion gel, the method comprising:
   providing a suspension of nanoparticles in a one-phase liquid mixture comprising selecting nanoparticles that form a colloidal gel in the one-phase liquid mixture; and
   triggering spinodal decomposition of the one-phase liquid mixture to form a two-phase liquid mixture,
   the nanoparticles aggregating into one phase of the two-phase liquid mixture to form a bicontinuous intraphase jammed emulsion gel (BIPJEL).

6. The method of claim 5, wherein selecting nanoparticles that form a colloidal gel in the one-phase liquid mixture comprises selecting the one-phase liquid mixture that has a pre-determined pH and selecting the nanoparticles that have a low surface charge at that pre-determined pH.

7. The method of claim 6, wherein the pre-determined pH is approximately 9.

8. The method of claim 5, wherein the nanoparticles are selected to be alumina-coated silica (AlO—SiO) nanoparticles.

9. The method of claim 8, wherein the nanoparticles are at a concentration of approximately 5 wt % to approximately 10 wt %; or approximately 5 wt % to approximately 15 wt %; or approximately 5 wt % to approximately 20 wt %.

10. The method of claim 9, wherein the nanoparticles are at a concentration of approximately 5 wt %; or approximately 10 wt %.

11. A method of forming a bicontinuous intraphase jammed emulsion gel, the method comprising:
   providing a suspension of nanoparticles in a one-phase liquid mixture comprising mixing the nanoparticles and the one-phase liquid mixture, wherein the mixing comprises low-energy mixing or high-energy mixing; and
   triggering spinodal decomposition of the one-phase liquid mixture to form a two-phase liquid mixture, the nanoparticles aggregating into one phase of the two-phase liquid mixture to form a bicontinuous intraphase jammed emulsion gel (BIPJEL).

12. The method of claim 11, wherein low-energy mixing comprises vortexing the nanoparticles and the one-phase liquid mixture.

13. The method of claim 11, wherein high-energy mixing comprises homogenizing the nanoparticles and the one-phase liquid mixture.

14. A method of forming a bicontinuous intraphase jammed emulsion gel, the method comprising:
providing a suspension of nanoparticles in a one-phase liquid mixture; and
triggering spinodal decomposition of the one-phase liquid mixture to form a two-phase liquid mixture, wherein the triggering spinodal decomposition comprises heating the suspension to or above the lower critical solution temperature of the one-phase liquid mixture to quench the one-phase liquid mixture into the two-phase liquid mixture, wherein the lower critical solution temperature is approximately 34° C.,
the nanoparticles aggregating into one phase of the two-phase liquid mixture to form a bicontinuous intraphase jammed emulsion gel (BIPJEL).

15. The method of claim 2, wherein isolating the BIPJEL as a porous monolith comprises freezing the BIPJEL.

16. The method of claim 15, wherein freezing the BIPJEL comprises submerging the BIPJEL in liquid nitrogen.

17. The method of claim 15, wherein isolating the BIPJEL as a porous monolith further comprises vacuum drying the BIPJEL.

18. The method of claim 2, wherein the porous monolith has macroporosity and mesoporosity.

19. A method of forming a bicontinuous intraphase jammed emulsion gel, the method comprising:
providing a suspension of nanoparticles in a one-phase liquid mixture;
mixing an additive into the suspension of nanoparticles in the one-phase liquid mixture; and
triggering spinodal decomposition of the one-phase liquid mixture to form a two-phase liquid mixture, the nanoparticles aggregating into one phase of the two-phase liquid mixture to form a bicontinuous intraphase jammed emulsion gel (BIPJEL).

20. The method of claim 19, wherein the additive is a water soluble polymer.

21. The method of claim 20, wherein the water soluble polymer is polyethyleneglycol.

22. The method of claim 19, wherein the additive is graphene oxide.

* * * * *